US012395319B2

United States Patent
Hudon-Voyer et al.

(10) Patent No.: US 12,395,319 B2
(45) Date of Patent: Aug. 19, 2025

(54) DATA TRANSFER USING A VIRTUAL TERMINAL

(71) Applicant: Apple Inc., Cupertino, CA (US)

(72) Inventors: Raphael Hudon-Voyer, Montreal (CA); Frank Andries van den Berg, San Jose, CA (US); Sebastien Fontaine, Montreal (CA); Frederic Arnaud, Montreal (CA); Neilson Proulx-Marcil, Montreal (CA); Pradeepa Krishnamoorthy, Llie-Perrot (CA); Guilherme Bicalho de Padua, Montreal, CA (US); Varun A. Vora, Campbell, CA (US); Jin W. Lee, South Barrington, IL (US)

(73) Assignee: Apple Inc., Cupertino, CA (US)

( * ) Notice: Subject to any disclaimer, the term of this patent is extended or adjusted under 35 U.S.C. 154(b) by 175 days.

(21) Appl. No.: 17/952,100

(22) Filed: Sep. 23, 2022

(65) Prior Publication Data

US 2023/0254123 A1    Aug. 10, 2023

Related U.S. Application Data

(60) Provisional application No. 63/307,626, filed on Feb. 7, 2022.

(51) Int. Cl.
*H04L 9/08*       (2006.01)
*G06F 9/455*      (2018.01)
(Continued)

(52) U.S. Cl.
CPC ........ *H04L 9/0822* (2013.01); *G06F 9/45558* (2013.01); *H04L 9/0825* (2013.01);
(Continued)

(58) Field of Classification Search
None
See application file for complete search history.

(56) References Cited

U.S. PATENT DOCUMENTS 5,978,840 A       11/1999   Nguyen et al.
11,290,257 B2 *    3/2022   Tanimoto .............. H04L 9/0869
(Continued)

FOREIGN PATENT DOCUMENTS

WO       2021230835 A1    11/2021
WO    WO-2022093218 A1 *  5/2022 ............. G06Q 20/10

OTHER PUBLICATIONS

International Search Report and Written Opinion of the International Searching Authority mailed May 25, 2023 in International Patent Application No. PCT/US2023/012432. 13 pages.
(Continued)

*Primary Examiner* — Lashonda Jacobs-Burton
(74) *Attorney, Agent, or Firm* — Kilpatrick Townsend & Stockton LLP

(57) ABSTRACT

Techniques for using a virtual terminal on a device to process a data transfer are described herein. These techniques provide the use of a virtual terminal for transfer of data, encryption of the data, and rewrapping the data. A virtual terminal receives virtual terminal kernel configuration data, configuring the terminal with a first public encryption key. The virtual terminal generates a second encryption key only known by the virtual terminal. The virtual terminal encrypts the second encryption key with the first public encryption key. The second encryption key is used to encrypt data for data transfer. The virtual terminal is associated with a secure element of a device that is outside the normal processor of the device. The secure element is designed for encryption.

20 Claims, 15 Drawing Sheets

(51) Int. Cl.
*H04L 9/14* (2006.01)
*H04L 9/32* (2006.01)
*H04L 67/06* (2022.01)
*G06Q 20/36* (2012.01)
*G06Q 20/38* (2012.01)
*H04L 67/02* (2022.01)

(52) U.S. Cl.
CPC .............. *H04L 9/14* (2013.01); *H04L 9/3213* (2013.01); *H04L 9/3234* (2013.01); *H04L 67/06* (2013.01); *G06F 2009/45595* (2013.01); *G06Q 20/36* (2013.01); *G06Q 20/3674* (2013.01); *G06Q 20/3821* (2013.01); *G06Q 20/3829* (2013.01); *H04L 67/02* (2013.01)

(56) References Cited

U.S. PATENT DOCUMENTS

| | | | | |
|---|---|---|---|---|
| 11,537,421 | B1* | 12/2022 | Brooker | H04L 9/0894 |
| 11,673,058 | B2* | 6/2023 | Schouviller | H04L 67/131 |
| | | | | 463/29 |
| 11,823,161 | B2* | 11/2023 | Shanmugam | G06Q 20/223 |
| 11,948,146 | B2 | 4/2024 | Prokop et al. | |
| 2004/0177260 | A1 | 9/2004 | Gilfix et al. | |
| 2010/0208889 | A1 | 8/2010 | Humphrey et al. | |
| 2011/0093883 | A1 | 4/2011 | Sun | |
| 2015/0006894 | A1* | 1/2015 | Bandyopadhyay | H04L 9/0866 |
| | | | | 713/171 |
| 2015/0154595 | A1* | 6/2015 | Collinge | H04L 63/062 |
| | | | | 705/71 |
| 2015/0287031 | A1 | 10/2015 | Radu et al. | |
| 2015/0332262 | A1* | 11/2015 | Lingappa | G06Q 20/3823 |
| | | | | 705/71 |
| 2015/0339664 | A1* | 11/2015 | Wong | H04L 63/0823 |
| | | | | 705/71 |
| 2016/0359832 | A1 | 12/2016 | Bao et al. | |
| 2017/0004496 | A1 | 1/2017 | Pujari | |
| 2017/0061419 | A1* | 3/2017 | Kim | G06Q 10/00 |
| 2020/0065803 | A1* | 2/2020 | Abouelenin | G06Q 20/388 |
| 2020/0279258 | A1* | 9/2020 | Agrawal | G06Q 20/3829 |
| 2021/0252409 | A1 | 8/2021 | Lee | |
| 2023/0368190 | A1 | 11/2023 | Baruvoori et al. | |

OTHER PUBLICATIONS

International Patent Application No. PCT/US2023/012432, "International Preliminary Report on Patentability", Aug. 22, 2024, 8 pages.

U.S. Appl. No. 17/952,094, Notice of Allowance, Mailed On Jan. 16, 2025, 13 pages.

* cited by examiner

DATA TRANSFER USING A VIRTUAL TERMINAL

CROSS-REFERENCE TO RELATED APPLICATIONS

This application claims priority under 35 U.S.C. § 119(e) to U.S. Provisional Application No. 63/307,626, filed on Feb. 7, 2022, the contents of which are herein incorporated by reference.

BACKGROUND

Electronic devices, especially portable electronic user devices, are quickly becoming ubiquitous in every modern society. Such devices can be used as terminals to transmit data with one another. Transmitted data can require encryption and decryption to protect sensitive data.

DETAILED DESCRIPTION

Figure 1:
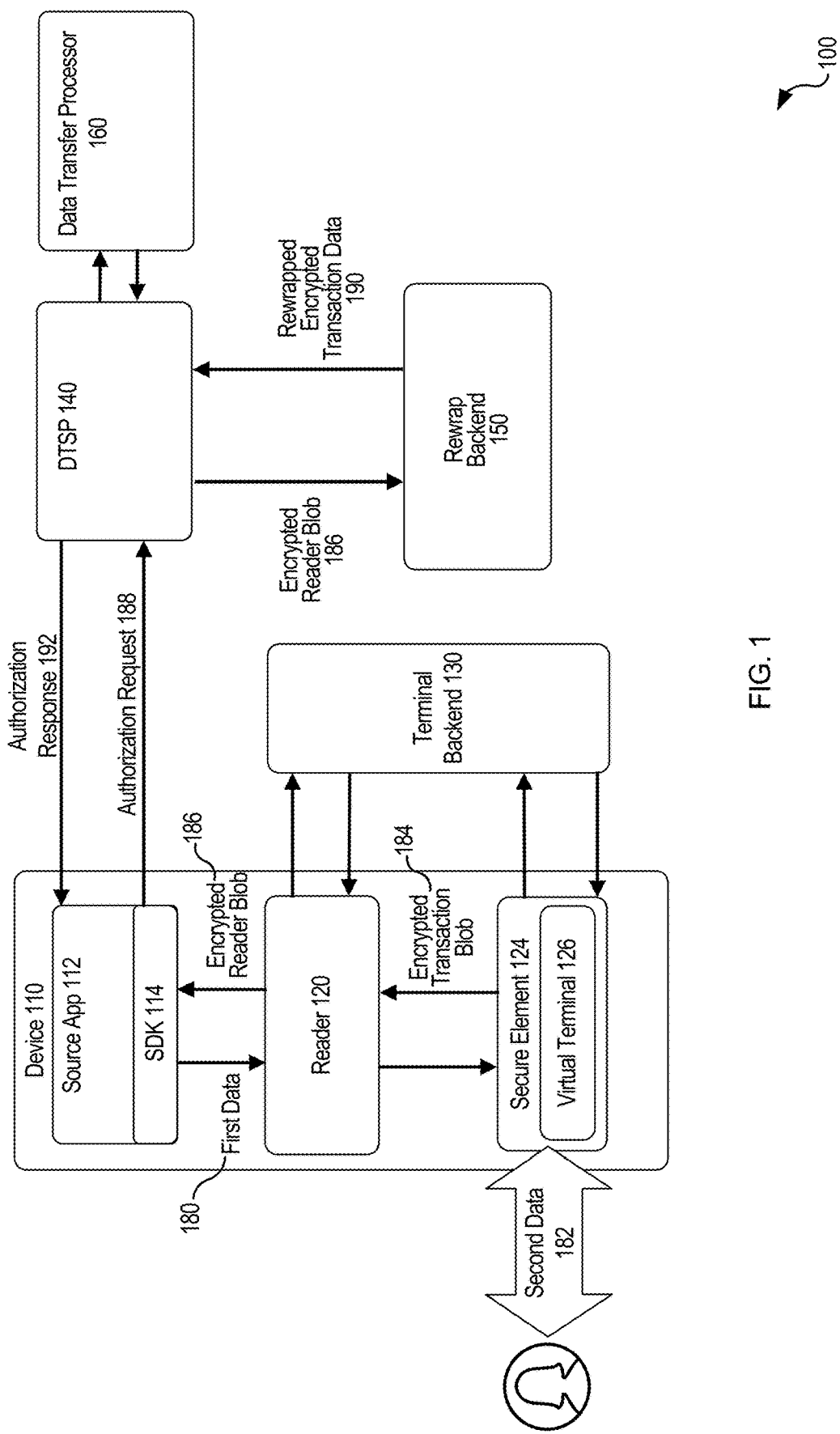
FIG. 1 illustrates a block diagram for performing the techniques described herein, according to an embodiment of the present disclosure.

In the following description, various examples will be described. For purposes of explanation, specific configurations and details are set forth in order to provide a thorough understanding of the examples. However, it will also be apparent to one skilled in the art that the examples may be practiced without the specific details. Furthermore, well-known features may be omitted or simplified in order not to obscure the example being described.

Examples of the present disclosure are directed to, among other things, methods, systems, devices, and computer-readable media that provide techniques for transmitting data using a virtual terminal. Unlike conventional data transmission, the techniques described herein enable a virtual terminal, which secures and encrypts data for transmission, on a multipurpose device (for example, a mobile device, a smart phone, tablet, etc.). A system including the virtual terminal can be configured to include a reader application (for example, a data reader application), an internal short-range data transceiver device (for example, an internal data reader such as a near-field communication (NFC) chip), a secure element, and a terminal profile identifier (terminal profile ID). The short-range data reception device may not be a component of an externally connected device (for example, a dongle), but rather integrated into the multipurpose device. In some cases, using the virtual terminal to transfer data may include transferring information about a transaction with an item/information source. In some examples, the virtual terminal can be used as a data reader (for example a data reader that reads data from a physical device or instrument). In some examples, a virtual terminal may not offer other functionality besides reading data and processing data in a closely integrated hardware module that may be designed for data security (for example, a secure element). While a virtual terminal system may include a data reader and/or a user input/output (I/O) (for example, screen/buttons), it may or may not include some or all networking configuration to process a transaction. There are many different potential setups, all indicated as terminals, with varying degrees of logic contained in different areas of the processing chain.

The techniques described herein provide for a mobile contactless data transfer device solution that allows users to accept data transfers using a multipurpose device (for example, a mobile device, a smart phone, tablet, etc.). In some examples, an item/information source may log into a source application (for example, using source login credentials). Once logged in, the source application can, in conjunction with a reader application, facilitate the receipt of data for a data transfer transaction. The mobile data transfer techniques can be enabled via (1) a third-party mobile data transfer application (the Source App) that integrates with a first-party (for example, corresponding to the specific device) data reader application on an application processor of the source's eligible mobile device using one or more application programming interfaces (API(s)) (collectively, the Frontend Integration) and (2) third-party data transfer systems that integrate with a backend platform (the Backend Platform) using APIs (collectively, the Backend Integration). Two separate suites of APIs can be provided: one for the third-party developers of Source Apps and one for the data transfer service providers (DTSP(s)) that contract with the sources to facilitate the processing of transactions for the sources. The Source Application can be source-facing and enable sources to accept contactless data transfers from users using either digital or physical closed loop transaction instruments or open loop data transfer instruments.

The techniques described herein may also include (1) performing certain attestation checks required by one or more relevant security standards or the like to validate the integrity of the data transfer solution (for example, validating the device processing the data transfer, and the operating system (OS) and various application/kernel configurations on the source's eligible device have not been modified), (2) a secure element in the mobile device that can generate a transaction-specific shared encryption key (also referred to herein as a transaction key) (for example, via ECIES), which the secure element can use to encrypt certain transaction information (for example, personal data) collected from the user's data transfer device (for example, a physical instrument or a digital instrument on a different mobile device) by the secure element, (3) the transaction key can then be encrypted by a public key (also referred to herein as the PAN server public key) known by the Backend Platform such that the encrypted transaction information and encrypted transaction key are used to generate an encrypted transaction blob (3) the encrypted transaction blob can be transmitted from the secure element to the Data Reader Application (for example, the application for the DTSPs) where additional metadata can be encrypted by a public key (also referred to herein as the transport server public key) known by the Backend Platform and then added to the encrypted transaction blob to create an encrypted reader blob, (4) the encrypted reader blob can be transmitted from the Data Reader Application to the Source App on the source's eligible mobile device (via the Frontend Integration), then from the Source App to the DTSP's data transfer system, and then from the DTSP's data transfer system to the Backend Platform (via the Backend Integration), (4) upon receipt of the encrypted reader blob, the Backend Platform can decrypt the metadata in the encrypted reader blob using a private key (also referred to herein as the transport server private key) to verify that the encrypted reader blob is verified, (5) once verified, the Backend Platform can decrypt the transaction key (using the PAN server private key) and reencrypt using a key encryption key (KEK) (for example, via ECIES) that was shared between the hardware security module in the DTSP's data transfer system and the hardware security module ("DTSP HSM") and a corresponding hardware security module of the Backend Platform via a key exchange process (also referred to herein as a key ceremony) conducted during the implementation of the Backend Integration (collectively, the "Key Rewrap"); (5) the encrypted transaction information and the reencrypted transaction key can then be transmitted back to the source's designated data transfer system via the Backend Integration (in some cases, the source's designated data transfer system may be a DTSP; however, in other cases, the source may manage this themselves (for example, directly integrating with the backend API and playing the role of a DTSP)); and (6) upon receipt of the encrypted transaction information and the encrypted shared key, the DTSP can decrypt the encrypted shared key using the KEK in the DTSP HSM and then decrypt the encrypted transaction information using the decrypted transaction key.

Information pertaining to the source's day-to-day business operations (for example, user authorizations and transaction histories) would be transmitted directly from the DTSP's data transfer system to the Source App and not through the Backend Platform.

Turning now to the figures, FIG. 1 illustrates an example block diagram 100 with example systems and components for implementing the virtual terminal techniques described herein. The device 110 includes a source app 112 (for example, application) which interacts with an SDK 114 in order to send first data 180 to the reader 120. Prior to the receipt of the first data 180, the reader 120 can interact with the terminal backend 130 to initialize a virtual terminal 126. The virtual terminal 126 is hosted within a secure element 124. The secure element 124 is a system designed for increase security as described herein. The secure element 124 receives the second data 182 which can detail how the data transfer can be provided to the source associated with the source app 112.

The virtual terminal 126 can generate transaction data using the first data 180 and the second data 182. The secure element 124 (and the virtual terminal 126) can also communicate with a terminal backend 130 for various security and encryption features described herein in order to encrypt the transaction data. In some implementations, the secure element 124 communicates with the terminal backend 130 via the reader 120 wherein the communications are encrypted. The virtual terminal 126 can encrypt the transaction data using a transaction key only known by the virtual terminal 126 and/or the secure element 124. The transaction key is then encrypted by a PAN server public key (which corresponds to a PAN server private key held by the terminal backend 130 and/or the rewrap backend 150) as described herein. Thus, virtual terminal 126 has a transaction key encrypted by a PAN server public key and transaction data encrypted by the transaction key. The virtual terminal can generate an encrypted transaction blob 184 from the encrypted transaction key and the encrypted transaction data. The encrypted transaction blob 184 can include additional metadata. The use of the encrypted transaction blob 184 can prevent transaction data from being exposed outside the secure element 124 before the DTSP 140 can process the transaction data.

The virtual terminal 126 then sends the encrypted transaction blob 184 to the reader 120. The reader 120 includes additional metadata about the data transfer which is encrypted using a transport server public key as described herein. The encrypted metadata (using the transport server public key) and the encrypted transaction blob 184 are used to generate an encrypted reader blob 186. In some implementations, the encrypted transaction blob 184 can also be encrypted by the transport server public key. The use of the encrypted transaction blob 184 can allow the rewrap backend 150 to verify the encrypted metadata to validate the transaction data without decrypting the transaction data. In some implementations, the combination of the reader 120, the secure element 124, and the virtual terminal 126 can be referred to as a virtual terminal system.

The reader 120 can send the encrypted reader blob 186 to the source app 112. The source app 112 can send the encrypted reader blob 186 with an authorization request 188 for the transaction to the data transfer service provider (DTSP) 140. The DTSP 140 cannot decrypt some or all of the encrypted reader blob 186 and sends it to the rewrap backend 150 for decryption. In some implementations, the rewrap backend 150 can decrypt the encrypted metadata of encrypted reader blob 186 using a transport server private key (which corresponds to the transport server public key) and verify various portions of the metadata in order to verify that the encrypted reader blob has been authorized by the DTSP 140, the source app 112, and/or the terminal backend 130 as described herein. This allows the rewrap backend 150 to verify the transaction and/or data transfer corresponding to the encrypted reader blob 186 (and associated encrypted transaction blob 184) without seeing the underlying unencrypted transaction data. This can ensure the privacy of the underlying transaction data as the source app 112 and rewrap backend 150 never unencrypt the transaction data encrypted by the transaction key. In some implementations, the rewrap backend 150 can also decrypt the encrypted transaction blob 184 inside to verify and validate various portions of additional metadata and transaction data.

Once the rewrap backend 150 has verified the metadata of the encrypted reader blob 186, the rewrap backend 150 can reencrypt the transaction key with a KEK, a symmetric key known by the DTSP such that the DTSP can decrypt the transaction key (using the KEK) and in turn decrypt the transaction data (using the transaction key). However, the transaction key is currently encrypted by the PAN server public key. The rewrap backend 150 can decrypt the transaction key using the PAN server private key (which corresponds to the PAN server public key). The rewrap backend 150 then reencrypts the transaction key with the KEK. In some implementations, the KEK of the rewrap backend 150 can be referred to as the rewrap KEK and the KEK of the DTSP 140 can be referred to as the DTSP KEK. In some implementations, the rewrap KEK and the DTSP KEK are symmetric keys that are essentially identical in functionality. The reencrypted transaction key can be referred to as the rewrapped transaction key. Reencrypting can be referred to as rewrapping.

The rewrap backend 150 then generates rewrapped encrypted transaction data 192 which includes the rewrapped transaction key and the encrypted transaction data. In some implementations, the rewrap backend 150 can generate rewrapped encrypted transaction data 192 by encrypting both the transaction key and the encrypted transaction data (encrypted by the transaction key) with the KEK (as described herein). In this way, the rewrap backend decrypts various forms of encryption and then reencrypts the transaction data. The rewrap backend 150 can send the rewrapped encrypted transaction data 190 to the DTSP 140.

The DTSP 140 can decrypt the rewrapped encrypted transaction data 190 using the KEK and then process the data transfer. In some examples, the data transfer service provider can work with data transfer processors 160 by sending the to the data transfer processors 160 for processing. An example data transfer processor is a payment processor. Once the data transfer has been processed or authorized, the data transfer service provider 140 can send an authorization response 192 to the source app 112. This can indicate that the second data was verified and authorized, the transaction was authorized, and the transaction was completed.

In some cases, the source app 112 is a source-facing application that can be responsible for initializing a data transfer. An example source app is a merchant app which can be responsible for initializing a sale or payment. The source app can be used to generate first data 180. In some implementations, the first data 180 can include data regarding the cost of the transaction, a description of goods or services, description of the time and place of the transaction, and the like. Through the use of the SDK 114, the source app 112 can communicate with the reader 120 and initialize a virtual terminal 126. For example, when the user starts a transaction, the source app 112 can contact the reader 120 through the SDK 114. In the initialization of the virtual terminal 126, the reader 120 initializes a particular virtual terminal 126 that is associated with the source app 112 and the DTSP 140. As such a different virtual terminal 126 will need to be initialized in order to communicate with a different pair of a source app 112 and a DTSP 140.

In some examples, the source may be ready to start a transaction (for example, receive data transfers), so a user may press "start transaction." Some transactions may be related to payments such that a user (for example, a customer) can enter some value (for example, $10), and press "pay." In response to this, the system can contact the software development kit (SDK) 114, and call a function (for example, "transact"). In some examples, the SDK 114 is the implementation of the APIs noted above with respect to the Frontend Integration. Then, the SDK 114 can pass the first data to the reader 120.

Prior to the transaction, the reader 120 needs to be initialized and configured as described herein. The reader 120 can be specific to a particular pairing of source app 112 and DTSP 140. The reader 120 can then initiate an instrument reader. The instrument reader can be an application (for example, corresponding to a second application, where the source app is the first application) and can then take control of the user interface (UI) of the device 110, presenting an instrument reader UI. In some examples, the instrument reader UI can be presented on top of the source app UI, the instrument reader UI may display information to the user, that identifies the requested data value (for example, $10), the name of the source, and how/where to place their instrument (for example, where to tap the instrument of the user). In some implementations, the instrument reader is a card reader. In some cases, the source logo or a default logo (for example, based on Merchant Category Code (MCC)) can be displayed.

In some implementations, the instrument can be a payment instrument or card (for example, a credit card, digital wallet application containing digital payment information, etc.). In some implementations, the instrument can be read by an instrument reader and the second data 182 is sent to the secure element 124 for processing. In some implementations, the reader 120 never receives the second data 182. In some implementations, the reader 120 never receives the second data 182 in an unencrypted form.

The secure element 124 receives both the first data 180 and the second data 182. The secure element 124 is designed for data security and ensures the security and integrity of the transaction data as described herein. The secure element 124 hosts the virtual terminal 126. The virtual terminal 126 generates transaction data from the first data 180 and the second data 182. The virtual terminal 126 can apply several layers of security and encryption as described herein. The virtual terminal 126 can encrypt the transaction data with a key that is only known by the secure element 124, known as a transaction key. Then the secure element uses a PAN session public key to encrypt the transaction key. The virtual terminal 126 receives/generates the PAN session public key during initialization of the virtual terminal 126 as described herein. The PAN session public key corresponds to a PAN session private key which is held by the terminal backend 130 and/or the rewrap backend 150. In some implementations, the PAN session public key is used to encrypt additional metadata. The encrypted transaction data (encrypted by the transaction key), the encrypted transaction key (encrypted by the PAN session public key) and the additional metadata are used to generate the encrypted transaction blob 184. The metadata can include various security and encryption information in addition to transaction data and can also be encrypted. The metadata can also include other data such as the description of the time and place of the transaction, the description and time of the encryption, and the like.

After the secure element 124 has generated the encrypted transaction blob 184, the encrypted transaction blob 184

(sometimes referred to as an encrypted blob) can be sent back to the reader 120. The reader 120 can then add additional metadata and further encryption to generate the encrypted reader blob 186. The metadata can be used to verify the transaction. In some implementations, the metadata is encrypted by a transport server public key while the encrypted transaction blob 184 is not further encrypted. The transport server public key can be generated during initialization of the reader 120 and corresponds to a transport server private key which is held by the terminal backend 130 and/or the rewrap backend 150. The reader 120 can send the encrypted reader blob 186 to the source app 112, and the instrument reader application UI can close, leaving the source application running (and displayed on the UI), and the source application now has the encrypted reader blob 186. In some examples, the instrument reader application UI is closed once authorization for the transaction is received by the source app 112.

Because the encrypted transaction blob 184 was encrypted with a transaction key that is only known by the virtual terminal 126, the source app 112 and DTSP 140 are not able to decrypt the transaction data. Further description of the encryption done by the virtual terminal 126 of the secure element 124 on the transaction data is described herein.

There are two system backends which work with the virtual terminal to encrypt and decrypt the transaction data. The system backends can provide security for data according to security standards (for example, the PCI CPoC Standard (collectively, the CPoC Validations)). The first backend can be referred to as the terminal backend 130 or the Contactless Payment on (Customer off-the-shelf Device (COTS)) (CPOC) (which can also be referred to as Mobile Payment on COD (MPOC) backend). The terminal backend 130 can also referred to herein as the instrument reader backend. In some implementations, the terminal backend 130 is configured to initialize the virtual terminal 126 before the data transfer (for example, of an instrument or other data transfer instrument). As part of the initialization, the terminal backend 126 can validate and/or perform many necessary initialization processes as described herein. These initialization processes can include verifying the virtual terminal token, generating the session token, sending the virtual terminal configuration to the secure element, running attestation checks, etc. as described herein.

The second backend can be referred to as the rewrap backend 150, the instrument data processor backend, or the data transfer rewrap backend. The rewrap backend 150, as described herein, handles the rewrap process which decrypts the encrypted reader blob 186 using a transport server private key to examine the metadata within. Using the metadata, the rewrap backend is able to verify that the data transfer has been authorized by the DTSP 140, the source app 112, and/or the terminal backend 130. In addition to the metadata, the encrypted reader blob 186 also includes the encrypted transaction blob which has the encrypted transaction key (encrypted by the PAN session public key) and the encrypted transaction data (encrypted by the transaction key). The rewrap backend 150 can decrypt the encrypted transaction key (encrypted by the PAN Session public key) using a corresponding PAN session private key once the metadata has been verified. The rewrap backend 150 then reencrypts the transaction key using a KEK to generate a reencrypted transaction key. The reencrypted transaction key and the transport-key encrypted transaction data can be referred to as the rewrapped encrypted transaction data 190 that can be decrypted by the DTSP 140. Referring back to the virtual terminal 126 and related terminal backend 130, the terminal backend 130 works with the virtual terminal 126 to securely encrypt the transaction data in the secure element 124.

After receiving the encrypted reader blob 186 from the reader 120, the source app 112 can send the encrypted reader blob 186 with an authorization request 188 to the DTSP 140 in order to determine if the transaction is authorized. In some examples, the DTSP 140 may be the same entity, or controlled by the same entity, which created the source app 112; however, it could be a completely different entity. For example, a source may make an account on a source app 112, such that the source does not own the source app but uses the source app to facilitate data transfer and other data transfer concerns. The source app 112 may then be operated by the same or a different entity as the DTSP 140.

In some implementations, the DTSP 140 is unable to decrypt the encrypted reader blob 186 upon receipt from the source app 112 because the decryption keys (the transport server private key and the PAN server private key) for the encrypted reader blob 186 is not known to the DTSP 140. This is part of the security of the encryption for the transaction data. Similarly, the source app 112 does not have the keys to decrypt the encrypted reader blob 186. These features help ensure the security of the encrypted reader blob 186. However, the DTSP 140 can send the encrypted reader blob 186 to the rewrap backend 150 for decryption.

In some examples, the DTSP could be a payment service provider (PSP) such as a bank (or, alternatively, a bank affiliate) or a corporate entity, such as an acquirer processor or a payment facilitator or aggregator, which is unlicensed or licensed as a non-bank financial institution (such as a money transmitter). Additionally, the transaction information can be transmitted as follows: (1) from a user through his or her payment device to the Secure Element in the source's (for example, merchant's) mobile device, (2) from the Secure Element to the Card Reader Application; (3) from the Card Reader Application to the Source App via the Frontend Integration; (4) from the Source App to the DTSP's payment system; (5) from the DTSP's payment system to the Backend Platform via the Backend Integration; (6) from the Backend Platform to the DTSP's payment system via the Backend Integration; (7) (a) if the DTSP is not an acquirer processor (for example, a payment facilitator or payment aggregator), from the DTSP to the acquirer processor to the payment network or (b) if the DTSP is an acquirer processor, from the DTSP directly to the payment network; (8) from the payment network to the issuing bank or issuer processor for authorization; and/or (9) with the authorization results sent back through the DTSP's system directly to the Source App. In some implementations, neither the application/device provider nor the Backend Platform will see any of the consumer's sensitive payment information.

The rewrap backend 150 has access to the proper keys (the transport server private key and the PAN server private key) to decrypt the encrypted reader blob 186. In some implementations, the rewrap backend 150 can use corresponding private keys (to the public keys used to encrypt the encrypted reader blob 186 and encrypted transaction blob 184) that encrypted the encrypted transaction key used to encrypt the transaction data and encrypt it with a key that the DTSP knows and provide the rewrapped encrypted transaction data 190 back to the DTSP. This is called rewrapping and will be covered in more detail below. In some implementations, rewrapping can mean that the "transaction key" can be unwrapped by decrypting the transaction key via the PAN session private key (corresponding to the PAN session public key used to encrypt the transaction key) and rewrapped using a backend KEK. The DTSP is able to use a DTSP KEK (which corresponds to the backend KEK) to unwrap the transaction key. The DTSP is then able to use the transaction key to decrypt the transaction data. Once this process is complete, the DTSP can have the transaction data for the data transfer and can process the data transfer with a data transfer processor.

Once the rewrap backend 150 has decrypted the encrypted reader blob 186 certain verifications of the metadata in the encrypted reader blob 186 can be performed. If the verifications are validated, the rewrap backend 150 can then decrypt the encrypted transaction key of the encrypted transaction blob 184 using the PAN server private key. The rewrap backend 150 can rewrap the transaction key using a rewrap KEK (which corresponds to a DTSP KEK), generating rewrapped encrypted transaction data 190 from the encrypted transaction data and the rewrapped transaction key. In this way, the DTSP 140, which has access to their particular DTSP KEK (which corresponds to the rewrap KEK), can decrypt the rewrapped transaction key of the rewrapped encrypted transaction data 190. The rewrapped transaction key can then be used to decrypt the encrypted transaction data. The rewrapped encrypted transaction data 190 can also be referred to as the rewrapped transaction data or rewrapped transaction blob. This step of reencrypting the transaction data on the rewrap backend 150 such that the transaction data is encrypted for the DTSP 140 to decrypt can be referred to as rewrapping. The rewrap backend 150 can include a hardware security module (HSM). Some or all of the encryption and decryption done on the rewrap backend 150 can be done in the HSM. Further description of the rewrap backend 150 and the processes performed by the rewrap process as described herein.

In some implementations, if the verifications are validated, the rewrap backend 150 can then decrypt the encrypted transaction key of the encrypted transaction blob 184 using the PAN server private key. In some implementations, the encrypted transaction data can be decrypted using the transaction key to verify/validate the transaction data. In some implementations, if the transaction data has been verified and/or validated, the rewrap backend 150 can encrypt the transaction key using a rewrap KEK (which corresponds to a DTSP KEK) and reencrypt the transaction data using the transaction key, generating rewrapped encrypted transaction data 190

The DTSP 140 is then able to decrypt the rewrapped encrypted transaction data 190 upon receipt. In some implementations, some or all decryption of the rewrapped encrypted transaction data 190 happens on a DTSP-controlled HSM (DTSP HSM). The DTSP 140 can then process the transaction data. For example, the DTSP 140 can determine if the second data 182 is payment information and whether there are sufficient funds associated with the second data 182. The DTSP 140 can also send the transaction data to another party for processing, such as the data transfer processor 160. Once the DTSP 140 (or the data transfer processor 160) has processed the transaction data, the DTSP 140 is able to send an authorization response 182 to the source app 112. The authorization response 192 can indicate whether authorization is granted or denied for the transaction.

Once complete, a message that indicates whether the data transfer was approved or not can be sent back to the source application. Additionally other information pertaining to the source's day-to-day business operations (for example, user authorizations and transaction histories) can be sent directly between the DTSP and the source app.

Figure 2:
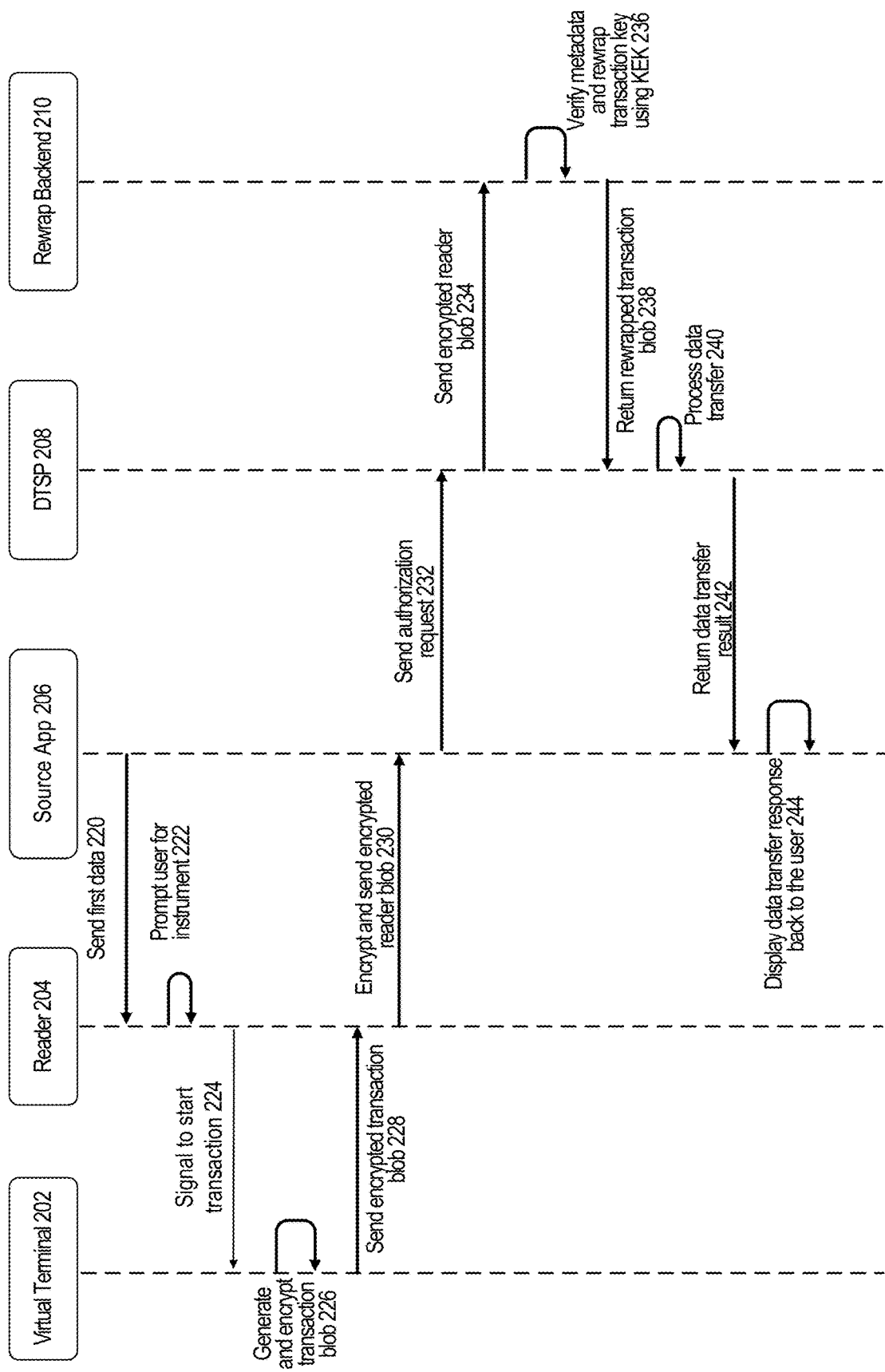
FIG. 2 illustrates a sequence diagram for illustrating the techniques described herein, according to an embodiment of the present disclosure.

FIG. 2 illustrates a sequence diagram 200 of an example high-level sequence for implementing the virtual terminal techniques described herein. The example sequence includes transmission and processing of data on the virtual terminal 202, the reader 204, the source app 206, the DTSP 208, and the rewrap backend 210. The virtual terminal 202, the reader 204, the source app 206, the DTSP 208, and the rewrap backend 210 are equivalent to the virtual terminal 126, the reader 120, the source app 112, the DTSP 140, and the rewrap backend 150 of FIG. 1, respectively. As noted before, the virtual terminal 202, the reader 204, and the secure element can be referred to as the virtual terminal system.

Prior to the beginning of the example sequence diagram 200, the DTSP 208 and the backend (for example, the terminal backend 126 of FIG. 1 and/or the rewrap backend 210) can exchange keys to be used for encryption and decryption of communications and transmissions between the DTSP 208 and the rewrap backend 210. In some implementations, these keys can be symmetric keys. In some implementations, these keys can be key exchange keys (KEK(s)). In some implementations, these keys can be symmetric KEKs. These keys will only be known by the DTSP 208 and the rewrap backend 210. The KEK for the DTSP 208 is known as a DTSP KEK. The KEK for the rewrap backend 210 is known as the backend KEK.

At block 220, the source app 206 can start a transaction by sending first data to the reader 204. The first data can be generated in the source app 206. For example, a source can enter the first data into the source app 206. The first data can include a data transfer parameter. The source app 206 can send that first data to the reader 204.

At block 222, the reader 204 can prompt a user for an instrument. The prompt can also be a request for second data. For example, the reader 204 can present a UI that prompts a user to present a data transfer instrument (for example, tap, swipe, or insert their credit card, debit card, or device hosting a digital wallet) wherein the data transfer instrument has the second data.

At block 224, the reader 204 can send a signal to the virtual terminal 202 that a transaction has started. The reader 204 can also send the first data. When the user provides the second data, the virtual terminal 202 can obtain the second data. Once the second data has been received, it can be used to generate transaction data.

At block 226, the virtual terminal 202 can then generate transaction data from the first data and second data. The virtual terminal 202 can then encrypt the transaction data using the transaction key to generate encrypted transaction data. The transaction key is generated in the virtual terminal 202 and/or the secure element such that only the virtual terminal 202 and/or the secure element know the transaction key. The transaction key is then encrypted using a PAN server public key. The PAN server public key corresponds to a PAN server private key which is held by the terminal backend and/or the rewrap backend 210. The PAN server public key is obtained during initialization of the virtual terminal 202 as described herein. Additional metadata can be added to the encrypted transaction data to generate an encrypted transaction blob. This encryption can occur within the secure element of the device and/or the virtual terminal 202 of the secure element.

Once the virtual terminal 202 has generated the encrypted transaction blob, the virtual terminal 202 and/or the reader 204 can relinquish control of the UI of the device. In some implementations, the relinquishment of the UI of the device can occur later. For example, the relinquishment of the UI of the device can occur after the transaction has been authorized by the DTSP 208 and/or at block 244 of example sequence 200.

At block 228, the virtual terminal 202 can then send the encrypted transaction blob to the reader 204. The encrypted transaction data can include other validation, verification, and encryption data in addition to the transaction data for the underlying transaction. At block 230, the reader 204 can then generate further metadata and encrypt the metadata using a transport server public key. The transport server public key corresponds to a transport server private key held by the rewrap backend 210 and/or the terminal backend. The encrypted metadata and encrypted transaction blob are used to generate an encrypted reader blob. The further metadata can include a session token. The second encryption is designed to protect integrity and confidentiality in transit via the source app 206 to the DTSP 208. The reader 204 can then send the encrypted reader blob to the source app 206. At block 232, the source app 206 send the encrypted reader blob and an authorization request to the DTSP 208 requesting authorization for the transaction.

At block 234, the DTSP 208 can send the encrypted reader blob to the rewrap backend 210. In some implementations, the DTSP 208 cannot decrypt the encrypted reader blob and must send the encrypted reader blob to the rewrap backend 210 for decryption. In some implementations, the DTSP 208 can decrypt parts of the encrypted reader blob to verify and validate certain information. In some implementations, the DTSP 208 can re-encrypt (for example, rewrap) the encrypted transaction data after this verification.

At block 236, the rewrap backend 210 can decrypt some or all of the encrypted reader blob to verify certain information as described herein. The rewrap backend 210 can decrypt the metadata in the encrypted reader blob to verify and validate the transaction. The rewrap backend can decrypt the metadata using the transport server private key (which corresponds to the transport server public key). For example, the rewrap backend 210 can verify the session token. If verification fails, then the rewrap process will not proceed.

Once the rewrap backend has verified the transaction after decrypting the metadata, the rewrap backend 210 can rewrap the encrypted transaction key. The rewrap backend 210 begins by decrypting the encrypted transaction key using the PAN server private key which corresponds to the PAN server public key used to encrypt the transaction key. Then the rewrap backend 210 can rewrap the transaction key using a KEK (for example, the rewrap backend's 210 KEK of the symmetric KEKs exchanged between the rewrap backend 210 and the DTSP 208). The rewrap backend 210 can then package the rewrapped transaction key (now encrypted by the KEK and not the PAN server public key) and the encrypted transaction data to generate a rewrapped transaction blob. At 228, the rewrap backend 210 can then send the rewrapped transaction blob (also referred to as the rewrapped transaction data or the rewrapped encrypted transaction data) to the DTSP 208. In some implementations, some or all of the decryptions done by the rewrap backend 210 are done in an HSM of the rewrap backend 210.

In some implementations, the rewrap backend 210 has to decrypt the encrypted reader blob to find the encrypted transaction blob and verify certain information as described herein. In some implementations, the rewrap backend can decrypt the encrypted transaction blob and verify certain information as described herein.

At block 240, the DTSP 208 can process the transaction. In some implementations, the DTSP 208 can process the transaction and data transfer by sending the transaction, or information associated with the transaction and/or data transfer to a third party. At 242, the DTSP 208 can return the transaction result to the source app 206. At 244, the source app 206 can display the data transfer response on the device hosting the source app 206.

Figure 3:
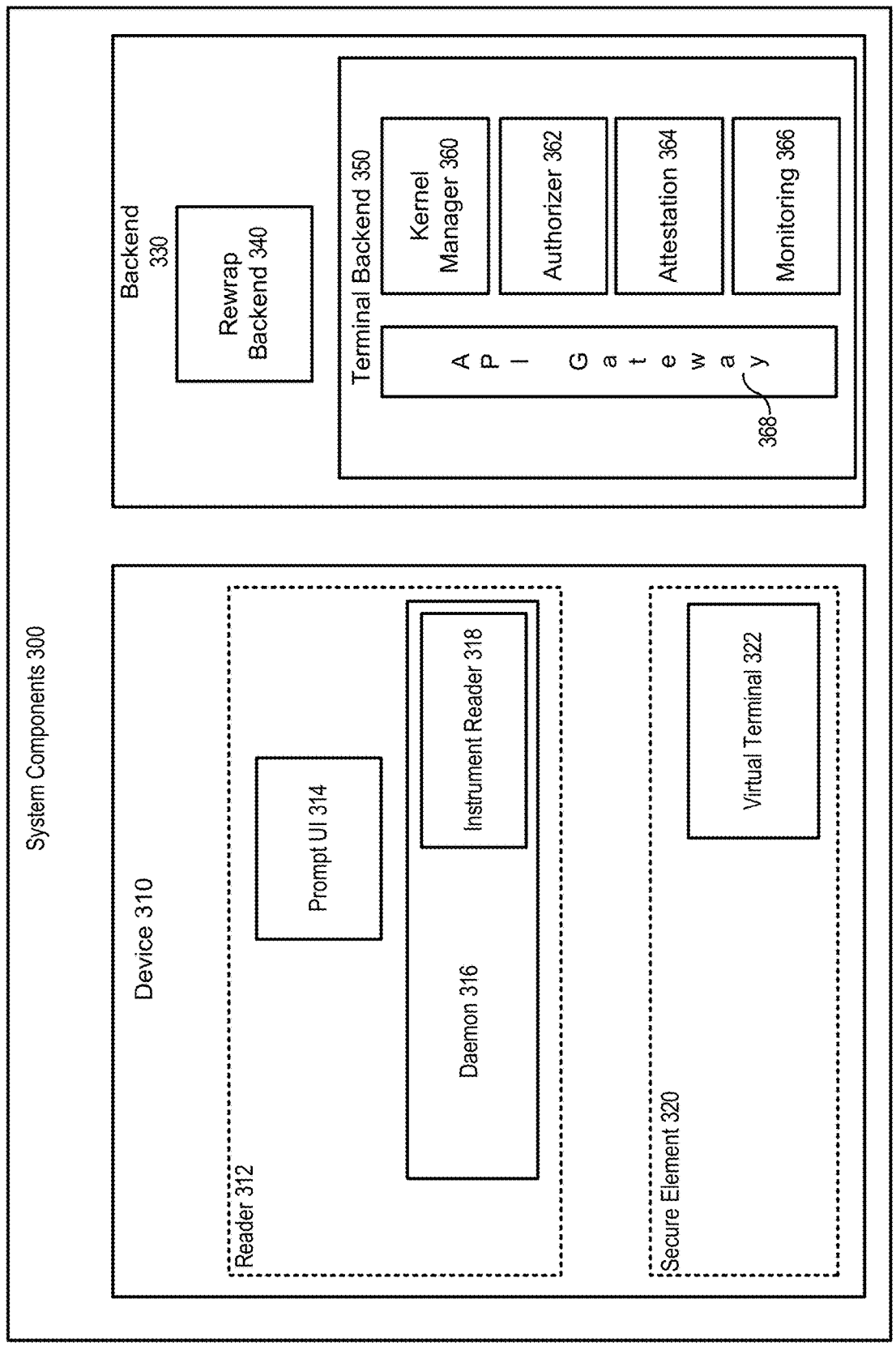
FIG. 3 illustrates a block diagram for illustrating the techniques described herein, according to an embodiment of the present disclosure.

FIG. 3 illustrates example system components 300. The system components can include components on the device 310 and components of the backend 330. The device 310 includes the reader 312 and the secure element 320. The reader 312 is hosted on the typical hardware of the device (for example, a processor used for most or all applications). There is also a secure element 320 which hosts the virtual terminal 322. The backend 330 is representative of server devices or external devices to the multipurpose device. The device 310, the reader 312, the secure element 320, the virtual terminal 322, the rewrap backend 340, and the terminal backend 350 are equivalent to the device 110, the reader 120, the secure element 124, the virtual terminal 126, the rewrap backend 150, and the terminal backend 130 of FIG. 1, respectively.

In some implementations, the reader 312 is implemented in software using part or all of a hardware component of the multipurpose device. The reader 312 can be run on the processor of the device alongside other applications and processes. The reader 312 can also include encryption services as described herein.

The reader 312 includes a prompt UI 314. The prompt UI 314 is used to indicate that the virtual terminal 322 is ready to receive the second data from a user. For example, the prompt UI 314 can be used to indicate that a user should present the second data. In some implementations, the prompt UI 314 can be used to indicate that a user should swipe, tap, or insert a card or use some kind of digital wallet on a mobile device. The prompt UI 314 can be used to indicate where on the multipurpose device a user should present their second data. For example, the prompt UI 314 may indicate to a user where to tap their card on the multipurpose device.

The reader 312 also includes a daemon 316 and an instrument reader 318. The daemon 316 can be used to run the processes and generate data associated with the device 310 that are not handled by the secure element 320. The daemon 316 can also be used to process the second data obtained by the instrument reader 318. The instrument reader 318 is used to read the second data from the user and process the second data.

The device 310 also includes a secure element 320. The secure element 320 is an element designed for security on the multipurpose device. In some implementations, the secure element 320 is a separate chip or hardware module from a processor of the device. For example, the secure element 320 can be operating on a separate chip from the processor running the reader 312. In some implementations, the secure element 320 is a software module that includes additional software security features for running processes, whereas the reader 312 does not use those additional software security features. In some implementations, the secure element 320 is specifically used only by the device 310 and only runs processes associated with the device 310. In some implementations, the secure element 320 runs some processes associated with the device 310, and also runs processes for other applications on the multipurpose device that need additional security features.

The secure element 320 houses the virtual terminal 322. The secure element 320 can house multiple virtual terminals 322 which correspond to different pairs of source apps and DTSPs. The virtual terminal 322 has a virtual terminal kernel (also referred to as a terminal kernel) that is configurable by a kernel token. The virtual terminal 322 is designed to encrypt data. For example, the virtual terminal 322 encrypts transaction data generated from the second data and the first data. The virtual terminal 322 can employ many types of keys, hashes, and other cryptography when encrypting data. Examples of encryption done by the virtual terminal 322 are contained herein.

The backend 330 represents system components that are not stored on the device 310. In some implementations, the backend 330 is representative of one or more devices, typically with server functionality. The backend 330 can include a rewrap backend 340 and a terminal backend 350. The terminal backend can include an API gateway 368, a kernel manager 360, an authorizer 362, an attestation subsystem 364, and a monitoring subsystem 366.

The rewrap backend 340 receives the encrypted transaction data (for example, the encrypted reader blob 186 of FIG. 1) from the DTSP, decrypts some or all the encrypted transaction data (for example, metadata of the encrypted reader blob 186 of FIG. 1 and the encrypted transaction key), verifies some or all of the transaction data (for example, the metadata of the encrypted reader blob 186 of FIG. 1), and then re-encrypts some or all the transaction data (for example, the transaction key after being decrypted using the PAN server private key) with a KEK associated with the DTSP. The rewrap backend 340 and the processes performed by the rewrap backend 340 are further described herein.

The API gateway 368 is used to mediate the interaction between the device 310 and the terminal backend 350. For example, the API gateway 368 mediates the communications, interactions, and transmission between the device 310 and the kernel manager 360, authorizer 362, attestation subsystem 364, and the monitoring subsystem 366.

The kernel manager 360 can be used to create and generate kernel tokens. The kernel manager 360 can also be used to generate scripts for the configuration of virtual terminals 322 in the secure element 320 of the device 310.

The authorizer 362 can be used to authorize DTSPs, sources, and devices to use the virtual terminal system. This ensures that only DTSPs, sources, and devices that have been accepted to use the virtual terminal system can use the techniques described herein. Authorization can include the use of tokens, keys, accounts, credentials, and the like.

The attestation subsystem 364 can be used to authorize and verify devices (for example, mobile devices and servers) using the virtual terminal system. The attestation subsystem 364 is part of security systems designed to prevent hacking or improper use of the virtual terminal system to create false transactions or hijack existing transactions. Hijacking transactions can include altering any transaction data related to a transaction such that the transaction data does not accurately match or correspond to the transaction.

The monitoring subsystem 366 can be used to monitor transactions and devices (for example, the virtual terminal 322 and the reader 312) using the virtual terminal system described herein. Monitoring transactions can be critical for compliance with CPOC and other regulations involving wire transfers, transactions, etc. and related devices.

Figure 4:
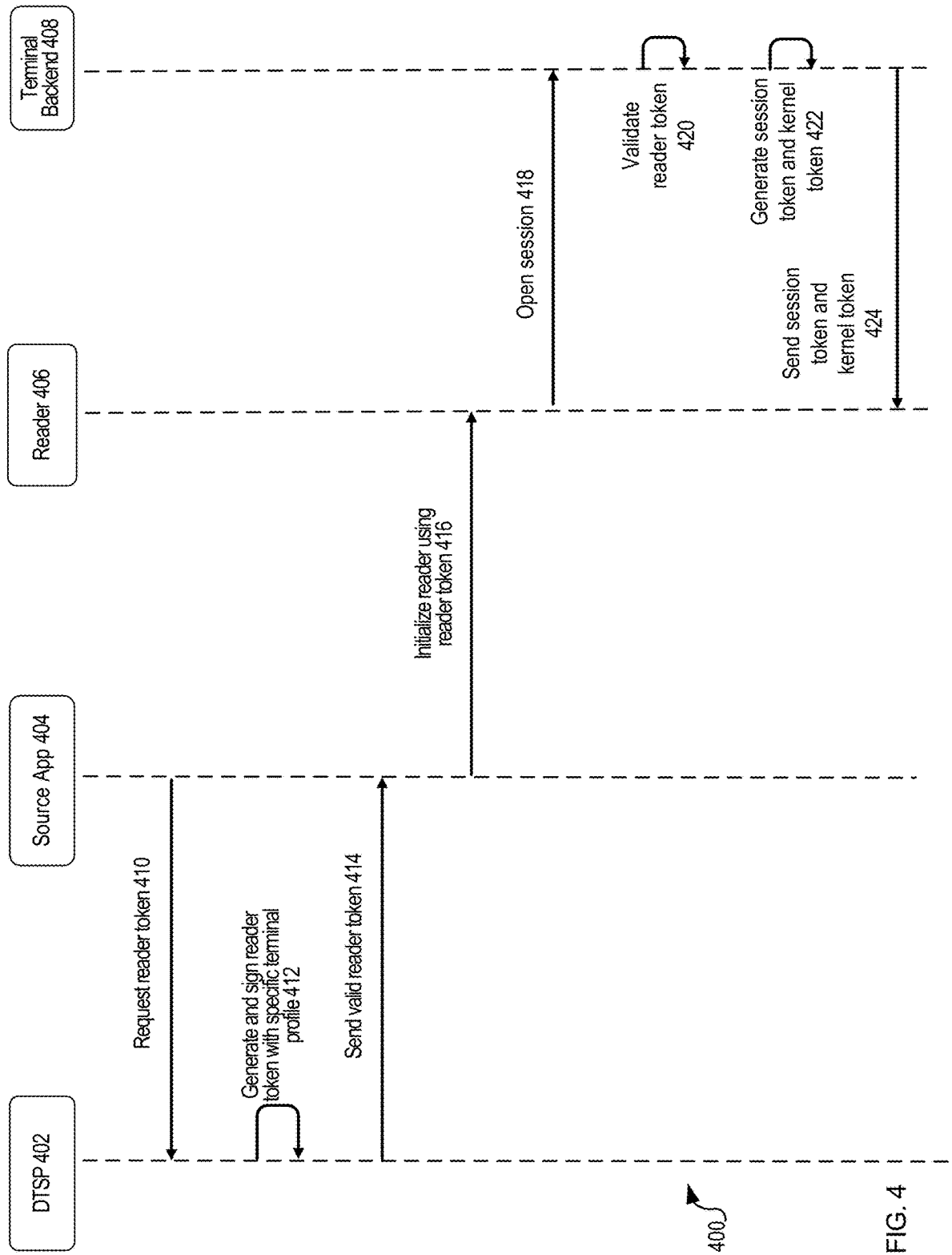
FIG. 4 illustrates a sequence diagram for illustrating the techniques described herein, according to an embodiment of the present disclosure.

FIG. 4 shows an example method 400 for initializing a reader and a virtual terminal. However, there are some initialization steps before a device can generate a reader and virtual terminal. When a source app wants to use a virtual terminal and reader on a device (for example, instead of a dongle), the source app will need to register with the DTSP. The DTSP assigns and/or uses terminal profiles to organize configuration data for different types of sources.

A terminal profile can consist of a set of personalization data used to configure the reader prior to a reader processing any transactions. All personalization data can be provided by a single terminal profile. The personalization data can also be used to configure the virtual terminal 322 of FIG. 3. Examples of configuration data for the profiles include what types of instruments are accepted (for example, payment instruments such as Visa, MasterCard, etc.) and/or what is the maximum amount acceptable for a single transaction. Once a profile has been created, it may be immutable such that a new reader needs to be created in order to have a new terminal profile. In some examples, DTSPs are responsible for providing all needed configuration values to create a terminal profile.

In some implementations, the DTSPs are able to create the terminal profiles themselves. In some implementations, the backend (for example, the backend 330 of FIG. 3) can generate terminal profiles and share possible terminal profiles with the DTSPs. DTSPs can request new terminal profiles with various configuration data. In some implementations, each new terminal profile has an associated profile ID. This profile ID can be stored by the DTSP for future usage.

DTSPs can have multiple terminal profiles which they can use for one or more sources. DTSPs can keep track of which sources have which profiles. The DTSPs can ask for profiles, and the backend can return the profile ID. In some cases, the backend can generate the profile and accompanying profile IDs. The backend can be able to upload the profile ID on a web portal for use by DTSPs. The DTSPs will have to log in to a portal provided by the backend. From there, they can find all profile IDs that were created for them. In some examples, there could be a shared profile that all sources use on a mobile device, or there could be one profile per source, as desired. In some cases, a profile is a file with the commands needed to configure the kernel token with the right configuration. The kernel token is used for configuration of a virtual terminal of the secure element and encryption keys used by the virtual terminal (for example, the PAN server public key).

Once the DTSP has determined what terminal profile to assign to the source, the DTSP sends the corresponding terminal profile ID to the source app. The source app will need to reference the terminal profile ID to the DTSP in order to initialize a reader according to a proper terminal profile ID that the DTSP uses. Thus, readers can be specific to particular DTSPs. For example, a multipurpose device can have a first reader associated with a first DTSP and a second reader associated with a second DTSP. In some implementations, the DTSP authorizes the source to have a reader. The source (for example, a store owner) can setup an account with a source application (for example, a mobile app that allows a business to receive money from customers). Then the source can then register with a DTSP. In some implementations, the source can use the source's credentials with the source application to register with the DTSP. After the source has registered, the source can request permission from a DTSP to generate a reader associated with that DTSP. Typically, the DTSP wants the source to use a particular type of reader which is communicated through a terminal profile.

Once the instrument reader is initialized, an instrument reader ID is returned to the source app. This instrument reader ID is linked to the lifecycle of the source app on the device. In some implementations, when the application is uninstalled and re-installed, a new instrument reader ID can be generated. In some implementations, the instrument reader ID is unique per source app installed on the same device. In some implementations, the instrument reader ID is persisted between instrument reader initializations. In some implementations, when a source app initializes an instrument reader on two different devices, each installation on each device can have a unique instrument reader ID. In some implementations, the instrument reader ID may be a concatenation of the device serial number and the application ID (plus, in some implementations, an installation ID).

Returning to FIG. 4, a source app 404 needs to request a reader token in order to generate a reader 406 associated with the DTSP 402. The reader token can also be referred to as a partner token or a DTSP token. The reader token can include configuration information for the reader. Configuration information can include a DTSP ID, an expiration field, a terminal profile ID, allowed app bundle IDs, and allowed virtual terminal IDs. The expiration field is used to determine an expiration time for the reader token which will also terminate the reader 406 on the device and the virtual terminal on the device. The DTSP ID can be used to identify the particular DTSP that issued the reader token. The terminal profile ID is used to configure the terminal kernel of the reader 406. The allowed app bundle IDs indicates which source apps (for example, the source app 404) that can use the reader token. The allowed virtual terminal IDs indicate which virtual terminal IDs are allowed to use this reader token. In some implementations, the allowed virtual terminal IDs correspond to reader IDs.

At block 410, the source app 404 can request a reader token from the DTSP 402. The source app 404 can include the assigned terminal profile ID in the request for the reader token. The DTSP 402 will know which source (using the source app 402) is requesting a reader token because the source app 402 will have asked for source login credentials prior to the initialization of the reader. Thus, the DTSP 402 can know what terminal profile ID it normally would give to the source app 402 and know that the source app 404 is initializing a reader 406 at this time. At block 412, the DTSP 402 can generate a reader token. The reader token can be generated with the specific terminal profile.

The reader token is used to securely pass information between the DTSP 402 (for example, the backend systems of the DTSP) and the reader 406. The most important information that needs to be communicated between the DTSP 402 and the reader 406 is the terminal profile ID associated with the reader 406. Using the reader token mechanism, the DTSP is able to indicate the terminal profile that may be used to initialize a reader. In some implementations, the reader token can be used to determine the lifespan of the reader, by setting a token expiration date. When the token expires, the reader can be automatically terminated. In some implementations, the reader token can be used to designate a certain source app to be the user of the token by referencing a source app ID associated with the source in the reader token.

Every reader token can be signed with any type of cryptographic algorithm (for example, ES256 or the like) using one or more keys (for example, ECDSA keys). The private key must be used by the DTSP to sign the token and the associated public key must be shared with the terminal backend and/or the rewrap backend.

The reader token has multiple uses. The reader token protects the data that it will be sending because reader token is tied to the DTSP 402, thus authenticating that a reader and corresponding transactions are tied to that particular DTSP 402. This is because the DTSP 402 is eventually going to have to ask for the data transfer data to be decrypted, and so the rewrap backend wants to make sure that the DTSP 402 authorized the data transfer to begin with. In some implementations, every DTSP 402 can have a different signature for signing reader tokens. Each DTSP 402 can sign different reader tokens and they can use multiple different terminal profiles. Through a gateway associated with the terminal backend 408 and rewrap backend, a DTSP can upload a public key for use by the terminal backend 408 and rewrap backend for encryption. This same gateway also allows the DTSP 402 to view, read, request, and change the various terminal profiles they can use. Then, the source app 404 can request a reader token from the DTSP 402, basically requesting authorization to have a reader initialized (for that source to use). Based on the source login, the DTSP will know which source is requesting the reader to be prepared. The source app would then have fetched a source login token for the user based at least in part on those login credentials. The DTSP 402 can decide which terminal profile the source should use and put the appropriate profile in a reader token and sign it. The token can also include information about how long the instrument reader can be available, whether or not to bind it to an instrument reader ID (also referred to herein as a terminal ID), and other details that the DTSP 402 controls. The DTSP 402 then returns that token to the source app 404, and the source app 404 can do a "prepare" (or "initialize") call by using the SDK (for example, the SDK 114 of FIG. 1) to initialize the reader. Now, the source application can use the SDK to pass the reader token and initialize the reader 406.

The reader token can include data that verifies that it is a reader token from the particular DTSP 402 (as opposed to another DTSP 402). In some implementations, the DTSP 402 can also sign the reader token. In order to protect the integrity of a terminal profile and to avoid misuse (or terminal profile swapping), the DTSP's backend asks the DTSP 402 to sign the reader token and/or the corresponding terminal profile ID (in some examples, the partner signs the terminal profile ID to show that the DTSP 402 intended to use the terminal profile as referenced by the terminal profile ID). It would not be desirable for the source to swap their profile. Since the profile is going through the source app, a hacker may attempt to change the profile. One way for the partner to protect the integrity of the reader token and the terminal profile ID is to create a JWT Token that includes the terminal profile ID, and to sign it. This token is referred to as the reader token. This token can be used as an API key. When the reader receives the reader token, it can validate the signature of the token. By validating the signature of the token, the backend can authenticate the DTSP 402 (because this confirms which DTSP 402 is initializing the terminal). This works because only the DTSP 402 has the private key to sign the token, and the backend has a table of public keys relating them to DTSPs. By authenticating, the mobile device can determine whether to allow the DTSP 402 to make a transaction.

At block 414, the DTSP 402 can return the valid reader token to the source app 404 such that the source app 404 can begin to generate a reader associated with the particular DTSP 402.

At block 416, the source app 404 can initialize a reader 406 using the reader token. The initialization of the reader 406 is done by calling the SDK (for example, the SDK 114 of FIG. 1) and using the reader token to initialize the reader 406. When requesting a reader initialization, the source app 404 the reader token can include the terminal profile ID. This terminal profile may be used to initialize the context of the reader and inform how the reader should be configured. Once a reader is initialized, it is bound to the terminal profile used during initialization, a source ID, instrument reader ID, and a specific DTSP. Every transaction that occurs on the reader can use the personalization data associated with the terminal profile. To change terminal profile, the reader will need to be re-initialized with a different profile ID. The terminal profile can be designated by the reader token received from the DTSP 402 by the source app 404 prior to instrument reader initialization. Once a reader 406 is initialized successfully, only the source application that initialized the instrument reader can use it. If another app tries to use it, the reader 406 will be automatically terminated.

At block 418, the reader 406 opens a session with the terminal backend 408. The reader 406 can send the reader token to the terminal backend with other configuration and authentication information.

At block 420, the terminal backend 408 can validate the reader token. This validation of the reader token can include multiple steps. The terminal backend can also be referred to herein as the instrument data processor backend or instrument reader backend. The terminal backend 408 looks at the reader token to make sure it is valid. The instrument reader backend can determine if the reader token is valid by checking if any information in it has been changed. In some implementations, the validation process can include validation of the DTSP signature associated with the reader token. In some implementations, the validation can check the expiration date or expiration time for the reader token to determine if the reader token has expired. Validation can also include validation of the reader token's payload. In some implementations, the validation can include validation of the app bundle ID, the virtual terminal ID, and the terminal profile ID. Once the terminal backend 408 performs validation on the virtual terminal token that the device and reader token are valid, the terminal backend 408 can allow the instrument reader (and/or instrument reader application) to initialize a virtual terminal with a kernel token.

Figure 5:
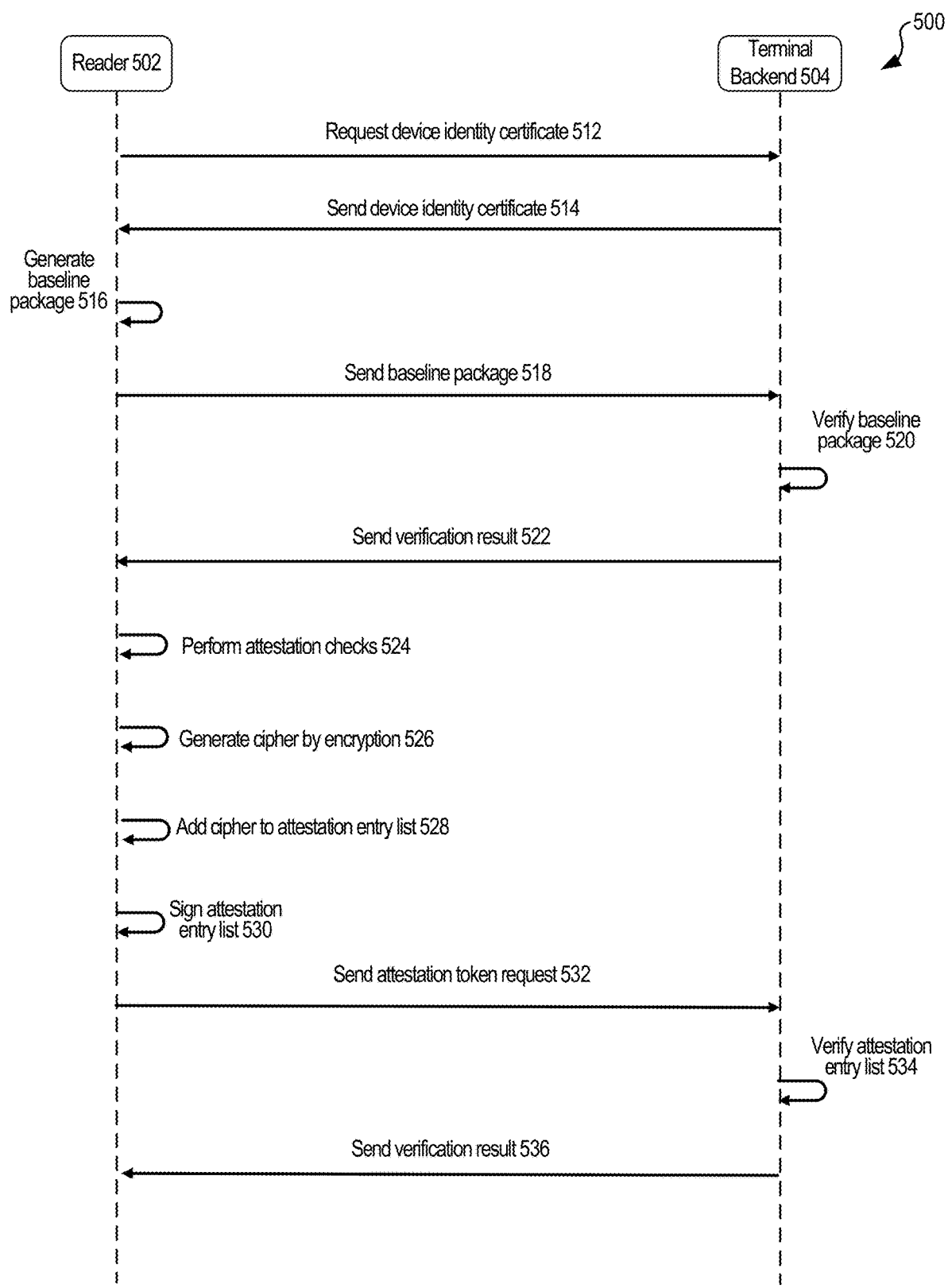
FIG. 5 illustrates a sequence diagram for performing the techniques described herein, according to an embodiment of the present disclosure.

The validation of the reader token can also include a part of an attestation process. In FIG. 5 an example sequence diagram 500 for attestation is shown. The attestation process occurs during the initialization of a reader 502. In some implementations, the attestation process is part of validating the reader token as seen at block 420 in FIG. 4. The attestation process is designed to help any backend services (for example, provided by the terminal backend 504 or the rewrap backend) know which device is making a call or requesting information from the backend services. In some implementations, the attestation process is designed to authenticate the particular device and/or the particular reader on a particular device. Authentication of a particular device can also refer to authentication of a secure element of a device or a terminal kernel in the secure element of a device. Attestation is also important for regulatory, security, and privacy reasons as part of implementing standards for CPOC.

At block 512, the reader 502 requests a device identity certificate from the terminal backend 504. In some implementations, the certificate is a secure element attestation service (SEAS) certificate. The device identity certificate creates a unique identifier for the particular secure element of the particular reader on the particular device. The device may already have such a unique identifier, such that the reader 502 may send that unique identifier to the terminal backend 504 in order to receive a certificate that contains that unique identifier (for example, a secure element ID (SEID)). In some implementations, issuance of that certificate can be rooted in a well-known Certificate Authority and using such rules. In some implementations, issuance of that certificate is dependent on passing device checks on the reader 502. Overall, the device identity certificate is meant to verify that the particular secure element/reader/device is an authorized device. At block 514, the reader 502 receives the certificate from the terminal backend 504.

At block 516, the reader 502 generates a baseline package regarding the reader 502. The baseline package can include baseline data about the device on which the reader is running. The baseline data can also include information regarding the secure element of the device. The baseline package is used to verify that a device is consistent. The baseline package can also include the device identity certificate. The baseline package can also include a signature from the reader 502. At block 518, the reader 502 sends the baseline package to the terminal backend 504 for verification. In some implementations, the part of the terminal backend 504 that is handling this verification is different than the part of the terminal backend 504 that handled the device identity certificate.

At block 520, the terminal backend 504 verifies the baseline package. The terminal backend 504 verifies that the signature from the reader 502 is valid. The terminal backend 504 verifies that the device identity certificate is valid, for example by verifying the ID of the device identity certificate. The terminal backend 504 verifies the baseline data. For example, the terminal backend 504 can determine if the baseline data is consistent with the baseline data format. The terminal backend 504 can also determine if the baseline data is consistent with the particular secure element, reader, and/or device.

At block 522, the terminal backend 504 sends the verification result to the reader 502. If verification failed, attestation fails. In some implementations, this causes initialization of the reader 502 to fail. If verification succeeds, the terminal backend 504 sends the attestation public key to the reader 502. The terminal backend 504 has an attestation private key which can be used for decryption of attestation information from the reader 502.

In some implementations, blocks 512, 514, 516, 518, 520, 522, 524, 526, 528, and 530 of the attestation process 500 are done in parallel to blocks 410, 412, 414 and 416 of FIG. 4 by the device. In such implementations, the blocks 512, 514, 516, 518, 520, 522, 524, 526, 528, and 530 are implemented by the processor of the device to eventually hand all the attestation-related data to the reader 506. In some implementations, the reader 406 can include the attestation token when at block 418 of FIG. 4 when the reader opens a session with the terminal backend 408.

At block 532, the reader 502 performs attestation checks to generate attestation results. Attestation checks can include verification of device related information. In some implementations, the attestation checks include verifying that the device identity certificate is still valid. In some implementations, the attestation checks verify the metadata of the transaction blob that is being attested to has matching information (for example, SEID, device ID, and the like) to the reader 502.

At block 534, the reader 502 generates a cipher by encrypting the attestation results of the attestation checks and the attestation public key. At block 536, the cipher is added to the attestation entry list of the reader 502.

At block 530, the reader 502 signs the attestation entry list with a secret key relating to the device identity certificate in preparation of requesting an attestation token. At block 532, the reader 502 sends an attestation token request to the terminal backend 504. The attestation token request includes the signature of the attestation entry list, the results of the attestation checks, and the device identity certificate.

At block 534, the terminal backend 504 verifies the attestation entry list. Verification begins with verifying the signature of the attestation entry list. The signature was based on the device identity certificate so the terminal backend 504 is able to verify the device identity certificate and that the signature matches. Then for each entry in the attestation entry list, the terminal backend 504 can decrypt the entry using the attestation private key. The terminal backend 504 then verifies the entries of the attestation entry list by comparing the entries against the baseline package.

At block 536, the terminal backend 504 can send the verification result to the reader app 502. If all of the attestation entries have been verified, the verification result can include an attestation token. The attestation token is used to indicate that the device is a verified device. If any of the attestation entries cannot be verified, attestation fails. The verification result can indicate this failure and can give an explanation for the failure of the attestation. In some implementations, the attestation token has an expiration date. In some implementations, the attestation token can expire after 15 minutes.

Returning to FIG. 4, at block 422, both a session token and a kernel token can be generated by the terminal backend 408 after the reader token and attestation token are verified. In some implementations, the reader token and the attestation token are used to generate the session token. In some implementations, the session token is used to validate the particular instance of the reader 406. In some implementations, the session token is used to handle a particular transaction between the source app 404 and the DTSP 402. The session token can include a virtual terminal ID. The virtual terminal ID can be based on one or more of the secure element ID (SEID), an app bundle ID, and an app installation ID. The SEID can be used to identify the secure element that is going to be encrypting transaction data related to the reader 406. The secure element ID can be obtained from the attestation token (for example, with reference to FIG. 5). The app bundle ID can be used identify the app that is using the reader 406. The app installation ID can be used to identify which instance of the app is using the reader 406. For example, if the app had been uninstalled and reinstalled on the device there would be a new app installation ID. The session token can also include a DTSP token. In some implementations, the DTSP token is the reader token. The session token can be concatenated with the encrypted transaction blob generated by the virtual terminal on the secure element, which can be checked by the rewrap service at rewrap time. If the session token is invalid, the rewrap will fail and the transaction is rejected or failed.

The kernel token is used to configure the kernel of the virtual terminal initialized by the reader 406. The kernel token can include the terminal profile ID. The terminal profile ID can be used by the kernel manager (for example, the kernel manager 360 of FIG. 3) to find the proper script to return to the reader 406 to configure the virtual terminal correctly. The kernel token can also include a DTSP ID. The DTSP ID can be used by the kernel manager to double check the DTSP has authorized the particular terminal profile ID requested. The kernel token can include a secure element ID which can be obtained from the attestation token (for example, with reference to FIG. 5).

At block 424, the session token and the kernel token are sent to the reader 406 for initialization. The kernel token can be used to configure the terminal kernel on the secure element. The session token can be used as part of validation of transaction payloads. In some implementations, the terminal backend 408 can send the transport server public key to the reader 406 at this time. In some implementations, the transport server public key is associated with the source app 404 and received by the source app 404 during initial setup with the virtual terminal system and backends. The transport server public key can then be shared with the reader 406 when the reader 406 is initialized.

Figure 6:
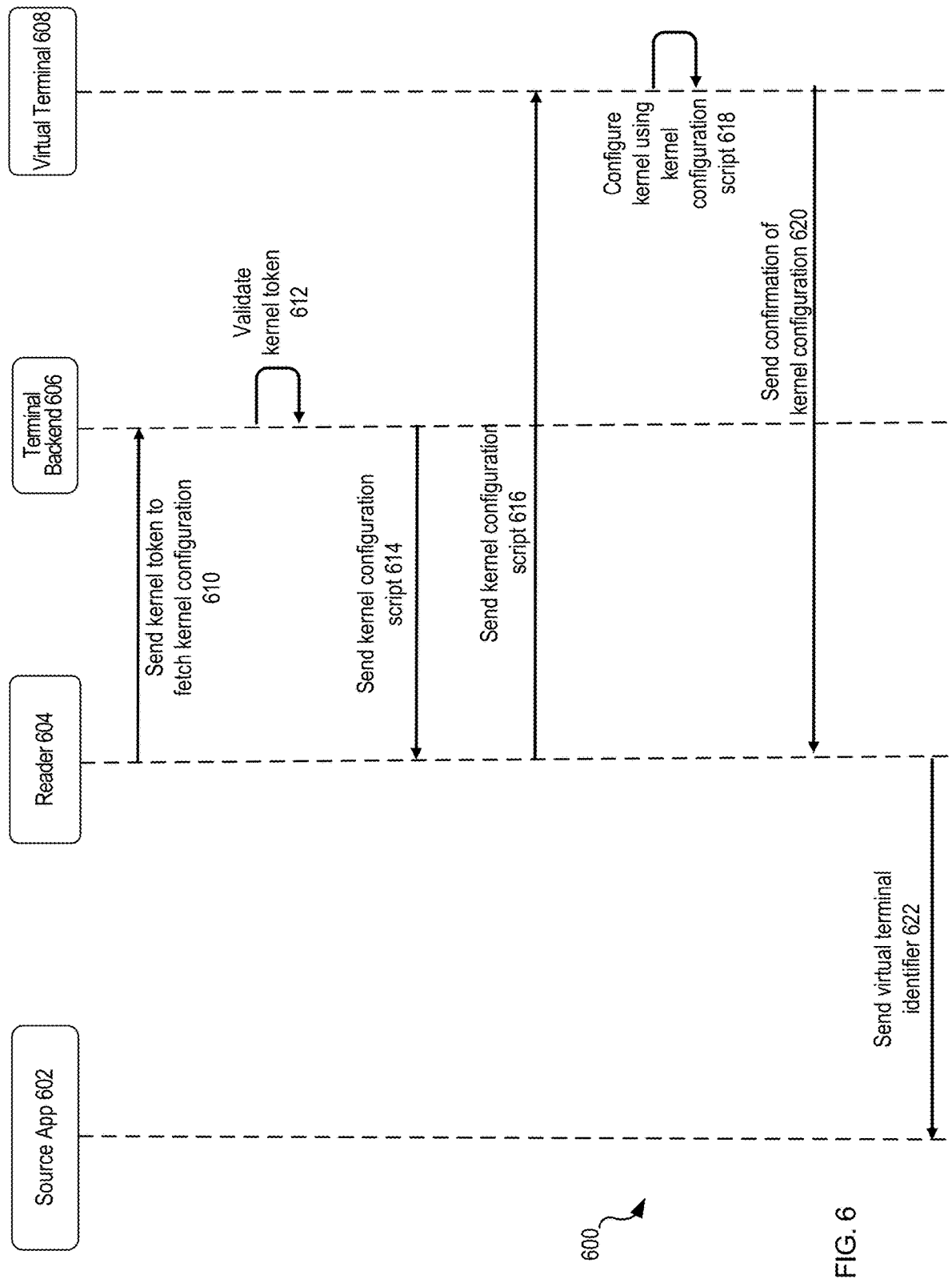
FIG. 6 illustrate a sequence diagram for describing the techniques described herein, according to an embodiment of the present disclosure.

In. FIG. 6, an example sequence diagram 600 for initializing and configuring a virtual terminal 608 is shown. The virtual terminal 608 can be seen as a secure counterpart to the reader 604 such that the virtual terminal is initialized and configured for a particular combination of a source app 602 and DTSP to handle specific transactions. The virtual terminal 608 also has a limited lifespan based on the lifespan of the reader 604. The virtual terminal 608 is housed in the secure element and is used to for enhanced security and verification through cryptography. In some implementations, the configuration of a virtual terminal 608 follows the initialization of a reader 604 (an example initialization of a reader is described with reference to FIG. 4). The virtual terminal 608 is configured by use of the kernel token.

At block 610, the reader 604 sends the kernel token to the terminal backend 606 to fetch the kernel configuration for configuration of the instrument reader. In particular, the kernel manager (for example, the kernel manager 360 of FIG. 3) receives the kernel token.

At block 612, the terminal backend 606 validates the kernel token. Validation of the kernel token can include validation of the SEID, the DTSP ID, and the terminal profile ID. The validation will make sure that all of these IDs match such that the secure element is verified to be authorized to have a virtual terminal corresponding to the DTSP.

At block 614, the terminal backend 606 sends a kernel configuration script to the reader 604. The kernel configuration script can include many types of kernel configuration information including a PAN session public key, PIN server public key, and KEK ID. The PAN session public key is for use by the virtual terminal 608 while the backend (both the terminal backend 606 and the rewrap backend) have a PAN session private key. The PAN session public key can be used to encrypt transaction information by the virtual terminal 608 in the secure element such that the backend can decrypt the transaction information later. The KEK ID ties the particular virtual terminal 608 to the DTSP to ensure that transactions are being tagged as corresponding to the correct DTSP. In some implementations, the kernel configuration script can also include other kernel configuration information as described herein. In some implementations, the PIN server public key is the transport server public key for use by the reader 604.

At block 616, the virtual terminal 604 sends the kernel configuration script to the terminal kernel 608. At block 618, the terminal kernel 608 can configure the kernel associated with the instrument reader using the kernel configuration script.

At block 620, the terminal kernel 608 can send confirmation of the kernel configuration to the virtual terminal 604. At block 622, the virtual terminal 604 can send the virtual terminal identifier to the source app 602. In some implementations, the virtual terminal identifier can be used to identify the particular virtual terminal 608 that was initialized and configured according to the kernel token. In some implementations, the virtual terminal identifier can be a combination of the SEID, the app bundle ID and the installation ID. This can ensure that the virtual terminal identifier does not change between configurations and/or sessions using different terminal profile IDs. In some implementations, the virtual terminal identifier can be used to identify on which device and in relation to what apps the virtual terminal 608 is running.

Figure 7:
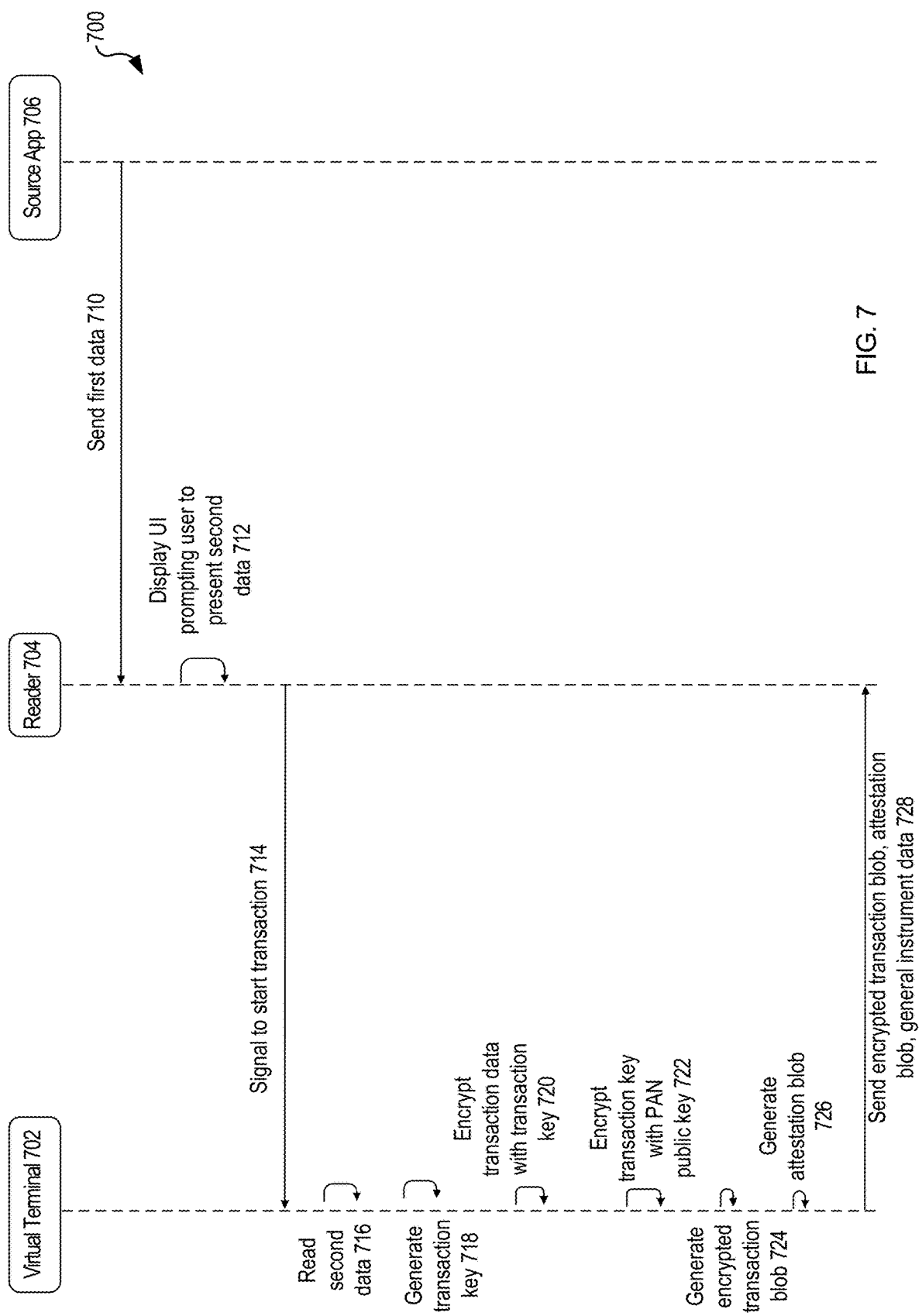
FIG. 7 illustrates a sequence diagram for performing the techniques described herein, according to an embodiment of the present disclosure.

In FIG. 7, an example sequence diagram 700 for generating and encrypting the transaction data into an encrypted transaction blob is shown. The encrypted transaction blob is encrypted using the virtual terminal 702 of the secure element. Thus, the encryption here is extremely secure such that normal processes, applications, and processors on the device are not able to access the transaction data. The encrypted transaction blob is designed to only be decrypted in the DTSP, namely the HSM of the DTSP for security. Initialization of the virtual terminal 702 and the reader app 704 has already occurred in preparation for handling transactions as described herein.

At block 710, the source app 706 can send first data to the reader 704. In some examples, this starts the transaction and the source application calls the "start transaction" API. In some implementations, the first data includes sale information such that the source app 706 can pass the amount for the transaction and the reader 704 can determine whether it is a purchase or a refund or a verification.

At block 712, the virtual terminal prompts the user to present the second data. In some implementations, the virtual terminal displays a UI prompting the user to present an instrument for data transfer (for example, data transfer can be payment information). The UI can indicate where the user should present the instrument (for example, tap the card or present another form of payment and/or second data).

At block 714, the reader 704 signals to the virtual terminal 702 that a transaction is being started such that the virtual terminal 702 can expect the second data. At block 716, the virtual terminal 702 reads the second data (for example, reads the instrument or card data) and the second data is received at the virtual terminal 702 (rather than the processor running other applications and/or the operating system of the device). The combination of second data and the first data can be known as the transaction data. In some implementations, first data can be sale information related to a sale. In some implementations, second data can be payment information related to how payment will be rendered in relation to a sale.

The virtual terminal 702 is a part of the secure element which was configured during terminal configuration. The secure element can a dedicated location with a dedicated processor, which is especially secure such that access is limited. The only applications that can be installed or run in the secure element are those that were added by the device manufacturer or approved by the device manufacturer. The virtual terminal 702 is such an application on the secure element. Thus, the secure element (and the virtual terminal 702) is a secure area, and even the processors running the operating system of the general-purpose device (for example, the device 110 of FIG. 1) cannot access the transaction data.

At block 718, a transaction key (TK) is generated by the virtual terminal 702 in the secure element. The transaction key is a random key is only known on that device within the secure element. At block 720, the virtual terminal 702 then encrypts the transaction data with the TK. Now, there is encrypted transaction data and the TK, but the TK is only known by the virtual terminal 702 and not by the reader 704, source app 706, device, DTSP, or backends. Furthermore, additional processing, for example, hashing can be done on the encrypted data transfer data.

At block 722, the TK is encrypted by the PAN session public key. As described herein, the PAN session public key corresponds to a PAN session private key that the backend has. In this way, the backend is able to decrypt the TK. In some implementations, the encrypted transaction data can be encrypted a second time by the PAN session public key as well. In some implementations, the encryption can be done by ECIES. When the virtual terminal 702 was initialized and configured, the PAN session public key was received from the terminal backend and is known by the rewrap backend, and the corresponding public key that is in the secure element is used to encrypt the TK. Now, there is 1) the TK (only known by the virtual terminal 702 in the secure element) which is encrypted by the PAN session public key and 2) encrypted transaction data that is encrypted by the TK (and potentially also by the PAN session public key).

At block 724, the terminal kernel generates the encrypted transaction blob. The combination of the encrypted transaction data and the encrypted transaction key is referred to as the encrypted transaction blob. The encrypted transaction blob can also be referred to as the encrypted blob and the transaction blob. The encrypted transaction blob is then packaged with additional metadata (for example, transaction profile, version, etc.). In some implementations, the metadata can also be encrypted. In some implementations, the metadata is encrypted in the same way as the transaction data and/or the TK. In some implementations, some or all the metadata can be used as a security check (for example, the version data can be used to make sure a hacker is not trying to use an old version). In some implementations, the metadata is not encrypted but rather signed by the virtual terminal 702. In this way, the metadata can be verified without needing to decrypt the metadata and/or other information (such as the transaction data) Additionally, in some examples, at encryption time, it will be determined which DTSP key encryption key (KEK) will be used for the rewrap. It is important to note that a KEK hash (for example, SHA256) is used as a diversifier (KDF) in the ECIES algorithm. For example, the KEK hash will correspond to a DTSP KEK (a key of that the DTSP has) so it should already be known which DTSP is associated with this transaction. In other words, the DTSP must be chosen at this stage, and the data transfer cannot be rerouted to another DTSP. In some examples, this is cryptographically bound, so only the DTSP key that is identified at this stage can be used for the rewrap later at the data transfer server.

At block 726, an attestation blob can be generated. In some implementations, the attestation blob is used to communicate that attestation has been performed and the virtual terminal, secure element, and/or device have been properly authorized when decryption and verification happens at the rewrap backend as described herein. In some implementations, the attestation blob is additional metadata (for example, transaction profile, version, etc.) that can be used for verification of the encrypted transaction blob without decrypting the transaction data.

At block 728. the encrypted transaction blob, attestation blob, and the general instrument data can be returned to the reader 704. The general instrument data includes general information that is not necessary to encrypt on-device for regulatory, security, and/or privacy reasons.

Figure 8:
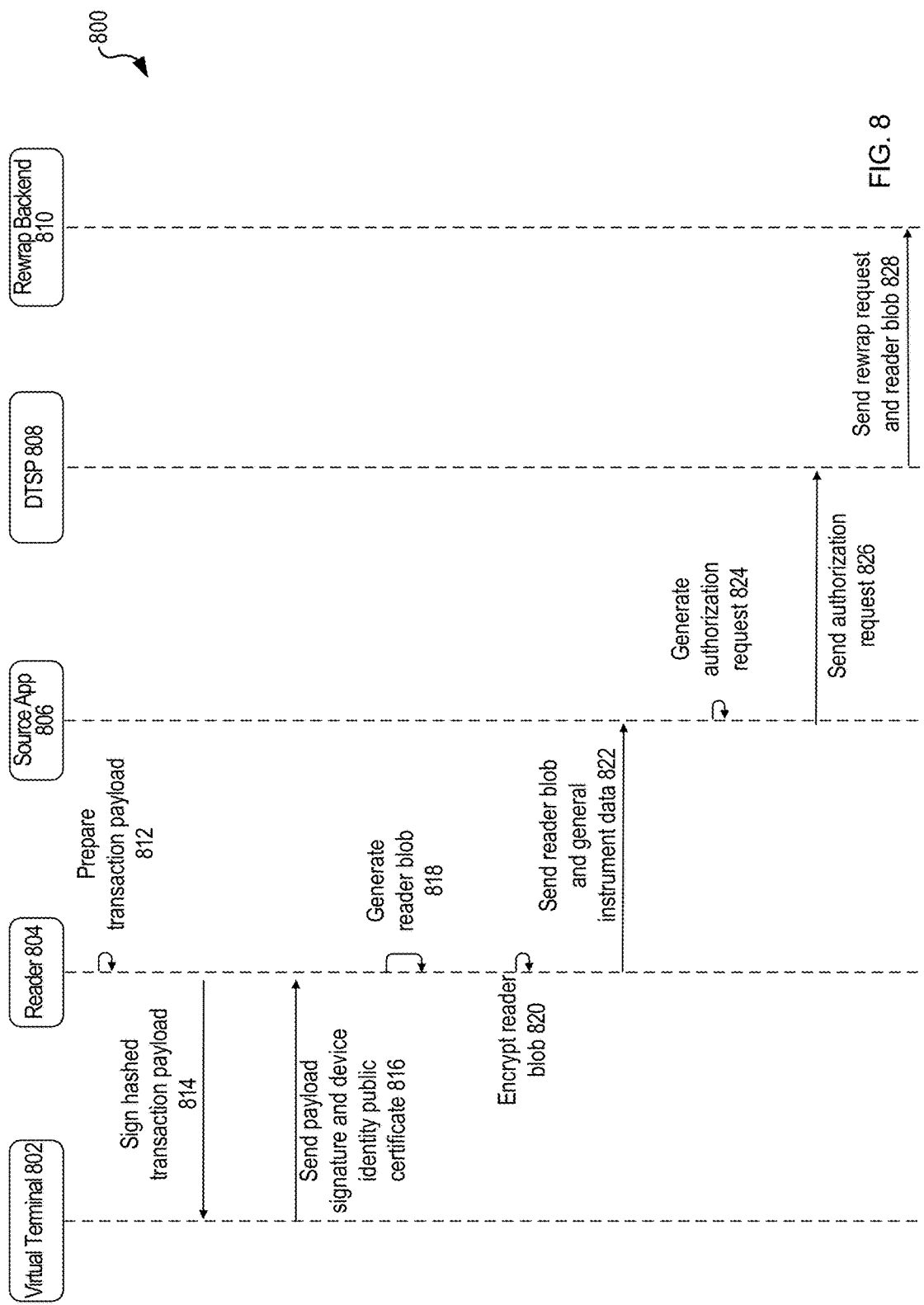
FIG. 8 illustrates a sequence diagram for performing the techniques described herein, according to an embodiment of the present disclosure.

In FIG. 8, an example sequence diagram 800 for encrypting the transaction blob for transmission to the DTSP 808. Here additional encryption is done after adding additional metadata. The additional metadata is used by the rewrap backend 810 to verify that proper authorizations for the virtual terminal 802 and the reader 804 have been completed and that the transaction was authorized by both the source app 806 and DTSP 808.

At block 812, the reader 804 is now configured to prepare the transaction payload which is composed of the transaction blob, the attestation blob, and the session token. The session token is used here to ensure that this particular transaction is authorized by both the DTSP 808 and the terminal backend (through attestation and the generation of the session token). The attestation blob includes metadata that can be used by the rewrap backend 810 to verify that the transaction was authorized.

At block 814, the transaction payload can now be hashed, sent back to the virtual terminal 802, and signed by the keys in the secure element and/or the virtual terminal 802 using the device identity certificate. First the reader 804 can hash the transaction payload and then send it to the virtual terminal 802. Then the virtual terminal 802 can sign the hashed transaction payload with a secret key related to the device identity certificate of the virtual terminal 802. This clearly signifies that this transaction payload was generated on the specific device that performed all of the previous steps. At block 816, the virtual terminal 802 sends the signed payload (or the payload signature) to the reader 804.

At block 818, the reader 804 generates the reader blob from the encrypted and signed transaction payload. The reader blob includes the transaction payload, the payload signature, the device identity public certificate, and the session ID of the session token.

At block 820, the reader blob can now be encrypted again for sending to the source app 806. In some implementations, the entire reader blob is encrypted. In some implementations, only the additional metadata added to the transaction blob to form the transaction payload and/or the reader blob is encrypted. The encryption is done by a transport server public key, which corresponds to a transport server private key that the rewrap backend 810 has. The reason for this additional encryption is to protect the personal/device information and the metadata added to the transaction blob such that the personal/device information and/or the metadata added to the transaction blob can be used to verify and validate the transaction data without decrypting the transaction data. In some implementations, this encryption is done using ECIES. Of note, all encryption described herein can be done by ECIES and other encryption algorithms based on the keys described herein.

At block 822, the virtual terminal sends the reader blob and general instrument data to the source app 806. The reader blob can be referred to as the encrypted reader blob 186 of FIG. 1. General instrument data can refer to any data. Example general instrument data can include data about the transaction (for example data about the payment method, or sale) that does not need to be encrypted for security, privacy, or regulatory reasons.

At block 824, the source app 806 generates an authorization request. In some implementations, the authorization request includes the reader blob and general instrument data. In some implementations, the authorization request is sent in parallel of the reader blob and general instrument data. At block 826, the source app 806 can then send the authorization request, reader blob, and general instrument data to the DTSP 808.

At the DTSP 808, the reader blob is encrypted, and the DTSP cannot obtain any transaction information. Thus, the DTSP 808 will need to send the reader blob to the rewrap backend 810. At block 828, the DTSP 808 can send a rewrap request with the reader blob to the rewrap backend 810 for decryption.

Figure 9:
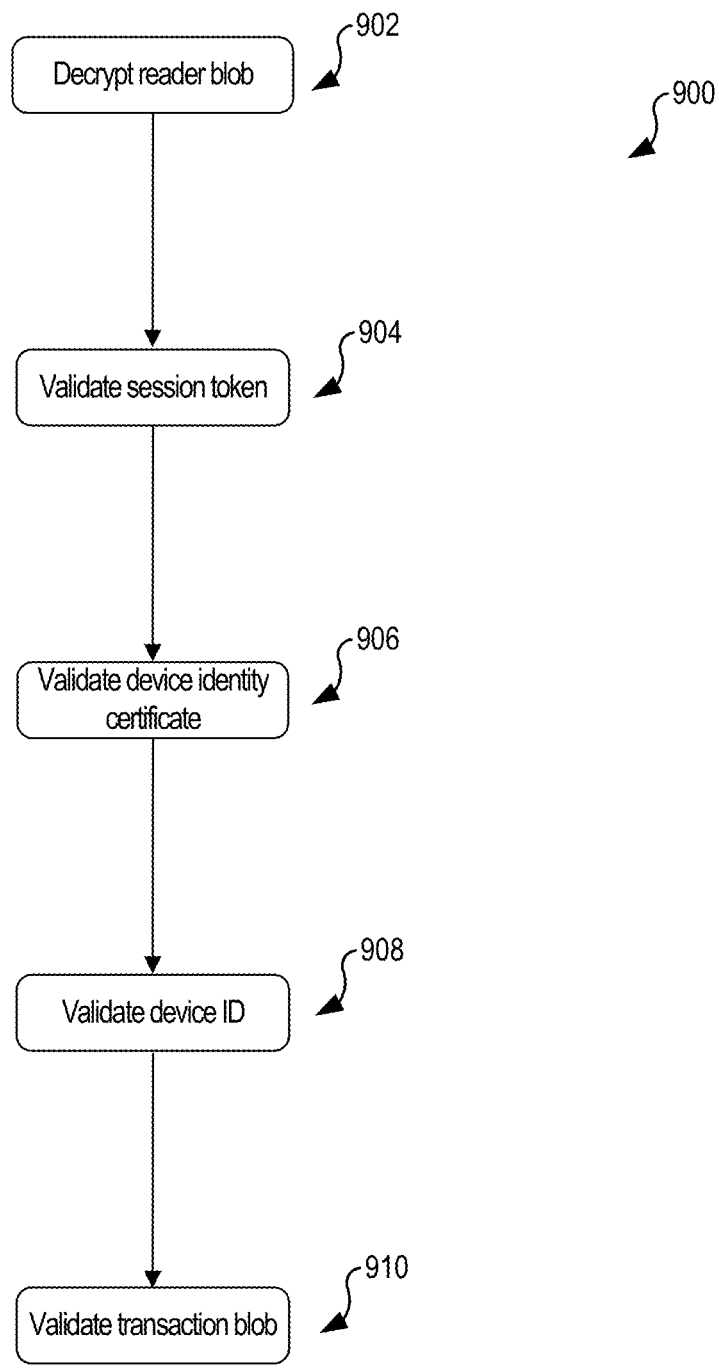
FIG. 9 illustrates a flow diagram for performing the techniques described herein, according to an embodiment of the present disclosure.

In FIG. 9, an example flow diagram 900 for decrypting the reader blob on the rewrap backend is shown. At block 902, the rewrap backend (for example, the rewrap backend 150 of FIG. 1) can decrypt the reader blob using the transport server private key, which corresponds to the transport server public key used to encrypt some or all of the reader blob. In some implementations, only parts of the reader blob are decrypted. In some implementations, this decryption is done via ECIES. The decryption of the reader blob can give the rewrap backend access to the payload signature, the device identity public certificate, the transaction payload, the session ID. As described above, the transaction payload includes the transaction blob, the attestation blob, and the session token.

At block 904, the rewrap backend can validate the session token. Validating the session token can include validating the signature of the session token, the format of the session token, and that the session token hasn't expired. The validation of the session token also includes validating the session ID that was included with the reader blob against the session ID in the session token.

At block 906, the rewrap backend can validate the device identity certificate of the reader block. For example, the rewrap backend can validate the signature of the transaction payload and device identity certificate. The device identity signature validation is meant to validate the secure element and/or the device as being the proper device from which the reader blob originated. In some implementations, the device identity certificate is verified using a key.

At block 908, the device ID is verified by the rewrap backend. The device ID can be associated with the secure element and be referred to as the secure element ID (SEID). This verification can be done by comparing the device ID stored in the attestation blob, the device ID stored in the session token, and the device ID stored in the device identity public certificate. If device ID across the different locations does not match, the whole reader blob is rejected and discarded because it is indicative that somehow a different device either opened the session, performed attestation, or was authorized to have a virtual terminal.

At block 910, the rewrap backend can validate the transaction blob signature. In some implementations, validating the transaction blob signature involves using the attestation private key.

Figure 10:
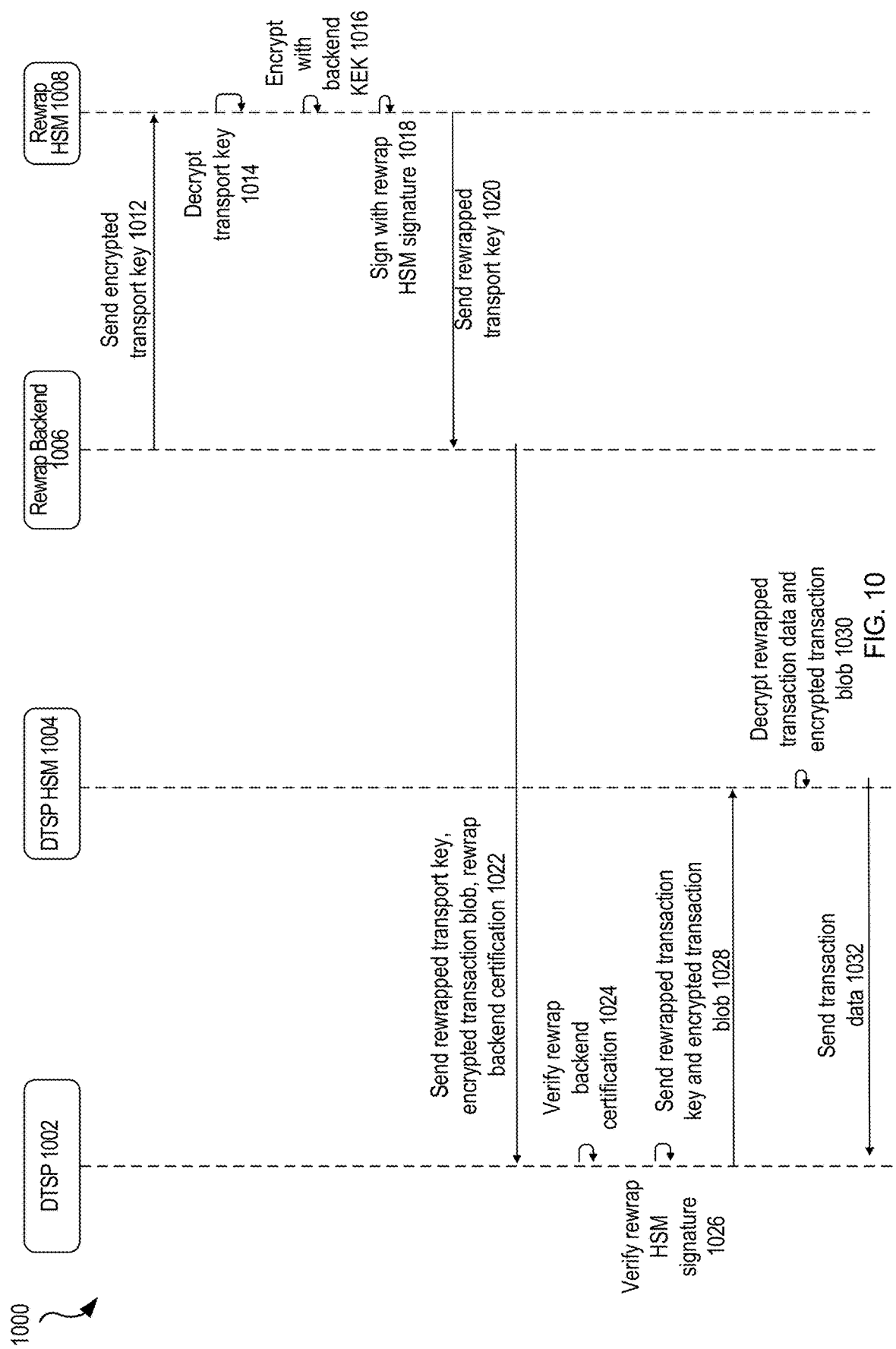
FIG. 10 illustrates a sequence diagram for performing the techniques described herein, according to an embodiment of the present disclosure.

In. FIG. 10, an example sequence diagram 1000 for rewrapping the transaction blob and how the DTSP 1002 receives the transaction data is shown. At this point, the rewrap backend 1006 has the encrypted transaction key (which is encrypted by the PAN session public key) and the encrypted transaction data (which is encrypted by the TK).

At block 1012, only the encrypted TK is sent to a rewrap Hardware Security Module (HSM) 1008. Decryption of keys requires strong security hence the reason the decryption of keys is done in the HSM.

At block 1014, the rewrap HSM 1008 decrypts the TK (which was encrypted by the PAN session public key that was given to the virtual terminal) using the PAN session private key. Now the TK is in the clear in the rewrap HSM 1008. As described herein, the rewrap HSM 1008 has increased security features. In some implementations, the rewrap HSM 1008 has separate hardware components from the rest of the rewrap backend 1006. In some implementations, the rewrap HSM 1008 includes additional physical safeguards to prevent tampering. For example, the rewrap HSM 1008 may include sensors that detect if rewrap HSM 1008 is moved causing the rewrap HSM 1008 to destroy all relevant data contained therein.

At block 1016, the TK is encrypted with the rewrap KEK (as described herein, the rewrap KEK corresponds, or is identical to, the DTSP KEK which was provided to the DTSP as part of a key ceremony) such that only the DTSP 1002 (or more properly the DTSP HSM 1004) can decrypt the TK using the corresponding DTSP KEK. In some implementations, the TK is encrypted into a TR31 key block. As described herein, the DTSP 1002 received a symmetric key (the DTSP KEK) which corresponds to the rewrap KEK in the rewrap HSM 1008 during a key ceremony. The rewrap KEK can also be referred to as the backend KEK. The symmetric key of the DTSP 1002 is referred to as the DTSP KEK and is stored in the DTSP HSM 1004. The backend KEK is loaded in the HSM and is used to encrypt the transaction key to send back to the DTSP 1002. As noted, the backend KEK is used to encrypt the transaction key. After the transaction key has been decrypted using the PAN session private key and reencrypted using the backend KEK, it can be referred to as the rewrapped transaction key.

At block 1018, the rewrapped transaction key is signed by the rewrap HSM 1008. This is meant to validate to the DTSP 1002 that the rewrap HSM 1008 has properly decrypted and rewrapped the transaction key for use by the DTSP 1002 and the DTSP HSM 1004. In some implementations, a ciphertext and some predefined element (for example, an IV or salt) is signed by the rewrap HSM 1008. This is meant to validate to the DTSP 1002 that the data encrypted in the secure element (for example, secure element 124 of FIG. 1) of the device was not modified in transit.

At block 1020, the rewrap HSM 1008 sends the rewrapped transaction key to the rewrap backend 1006. In some implementations, the rewrap backend 1006 can then certify the rewrap using a rewrap backend certification. At block 1022, the rewrap backend 1006 can send the rewrapped transaction key, the encrypted transaction blob, and the rewrap backend certification to the DTSP 1002. In some implementations, the rewrap backend 1006 also sends the signature with the associated rewrap backend certificate for validation by the DTSP 1002.

At block 1024, the DTSP 1002 can verify the rewrap backend certification. In some implementations, the verification of the rewrap backend certification can be verified using the signature associated with the rewrap backend certificate. This is based on keys that were shared between the rewrap backend 1006 and the DTSP 1002 and/or the certificate that was sent from the rewrap backend 1006 at block 1022. At block 1026, the DTSP 1002 can verify the rewrap HSM signature based on keys that were shared with the DTSP 1002 and/or based on the certificate provided by the rewrap backend 1006 at block 1022. The DTSP 1002 now has the encrypted data and the rewrapped transaction key (which is encrypted with the DTSP KEK).

At block 1028, the encrypted transaction blob and the rewrapped transaction key are sent to the DTSP HSM 1004. The DTSP HSM 1004 server can then be configured to decrypt the rewrapped transaction key using the DTSP KEK. Then, the partner server can use the transaction key to decrypt the transaction data (for example, the transaction blob) to acquire the transaction data that they can use to request the transaction be processed by a data transfer processor. At block 1032, the DTSP HSM 1004 sends the transaction data to the DTSP 1002.

Once the DTSP 1002 receives the transaction data, the DTSP 1002 can process the transaction or send to a data transfer processor. Once the data transfer has been processed, the DTSP 1002 can receive information from the data transfer processor that indicates whether it was approved or declined, and that information can be shared with the source application. The source application can then present such information on the UI of the device.

Figure 11:
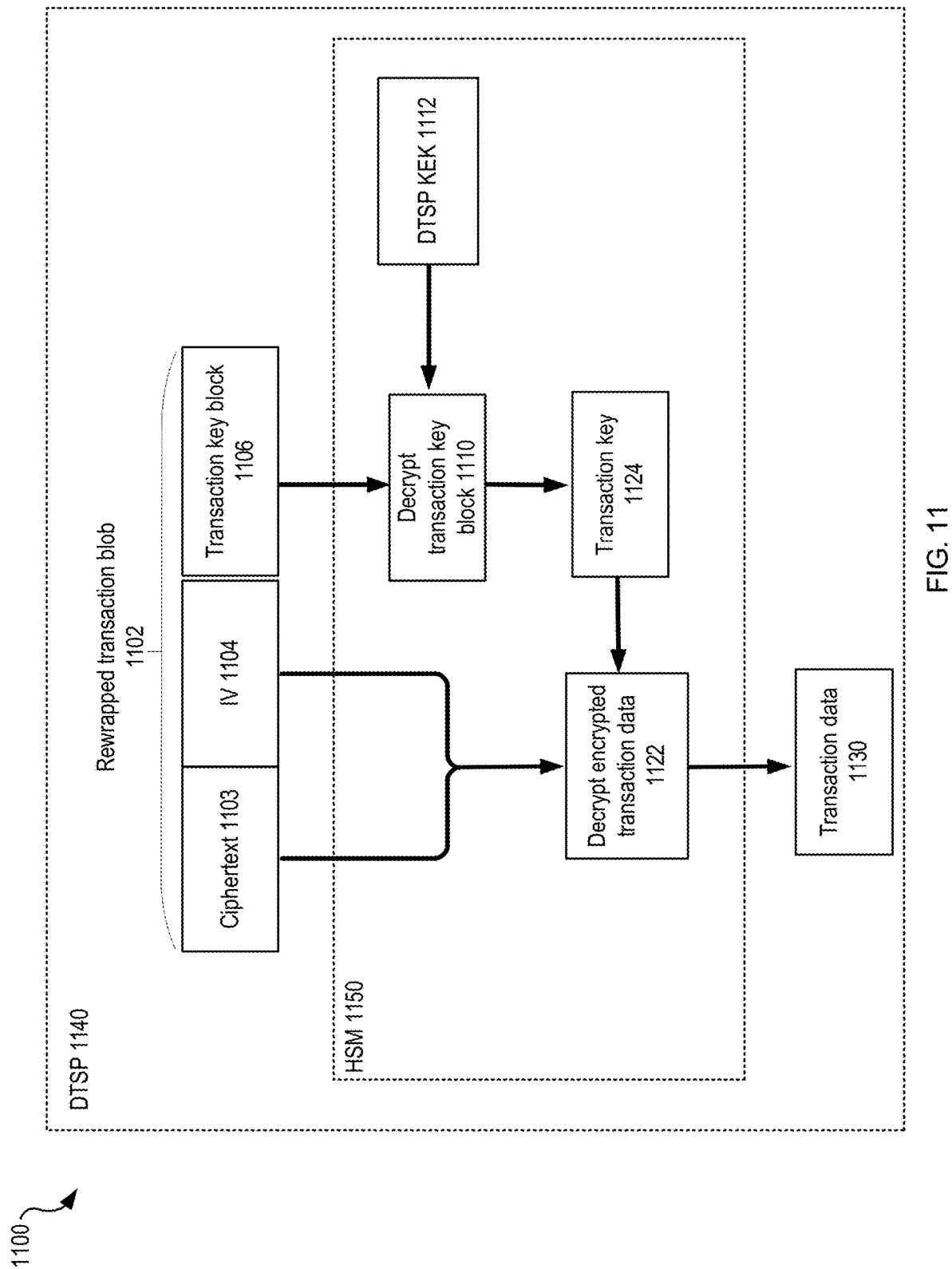
FIG. 11 illustrates a block diagram for performing the techniques described herein, according to an embodiment of the present disclosure.

In FIG. 11, an example diagram 1100 for decrypting the rewrapped transaction blob 1102 (which can include the encrypted transaction blob and the rewrapped transaction key) is shown. The DTSP 1140 and the DTSP HSM 1150 are involved in this decryption. The DTSP 1140 receives the rewrapped transaction blob 1102 from the rewrap backend. The rewrapped transaction blob 1102 includes the ciphertext 1103, the IV 1104, and the transaction key block 1106 which are all recognizable as separate pieces of the rewrapped transaction blob. The ciphertext 1103 and the IV 1104 represent the encrypted transaction data which contains the transaction data and can contain parts or all of the first data and the second data. As noted above, the data transfer data can include instrument and user data.

Decryption in the DTSP 1140 is handled by the DTSP HSM 1150. The DTSP HSM is a special hardware module or system that is designed for cryptography and to be especially secure as described above. In some implementations, the DTSP HSM 1150 is a subsystem of the DTSP 1140.

At block 1110, the HSM 1150 decrypts the transaction key block 1106 using the DTSP KEK 1212. The DTSP KEK 1112 was exchanged between the system backend (for example, the rewrap backend 150 of FIG. 1 and/or the terminal backend 130 of FIG. 1) when onboarding the DTSP 1140 to use the virtual terminal system as described herein. The decryption will lead to the transaction key 1124 (for example, the transaction key as described with reference to FIG. 7).

At block 1122, the HSM 1150 can then decrypt the encrypted transaction data from the ciphertext 1103 and the IV 1104 using the transaction key 1124. This is the same transaction data and encrypted transaction data referred to by FIG. 7. Once the transaction data has been decrypted from the ciphertext 1103 and the IV 1104, the HSM 1150 can then send the transaction data 1130 to the DTSP 1140. The DTSP 1140 can extract the second data and the first data from the transaction data for processing of the data transfer and/or transaction.

Figure 12:
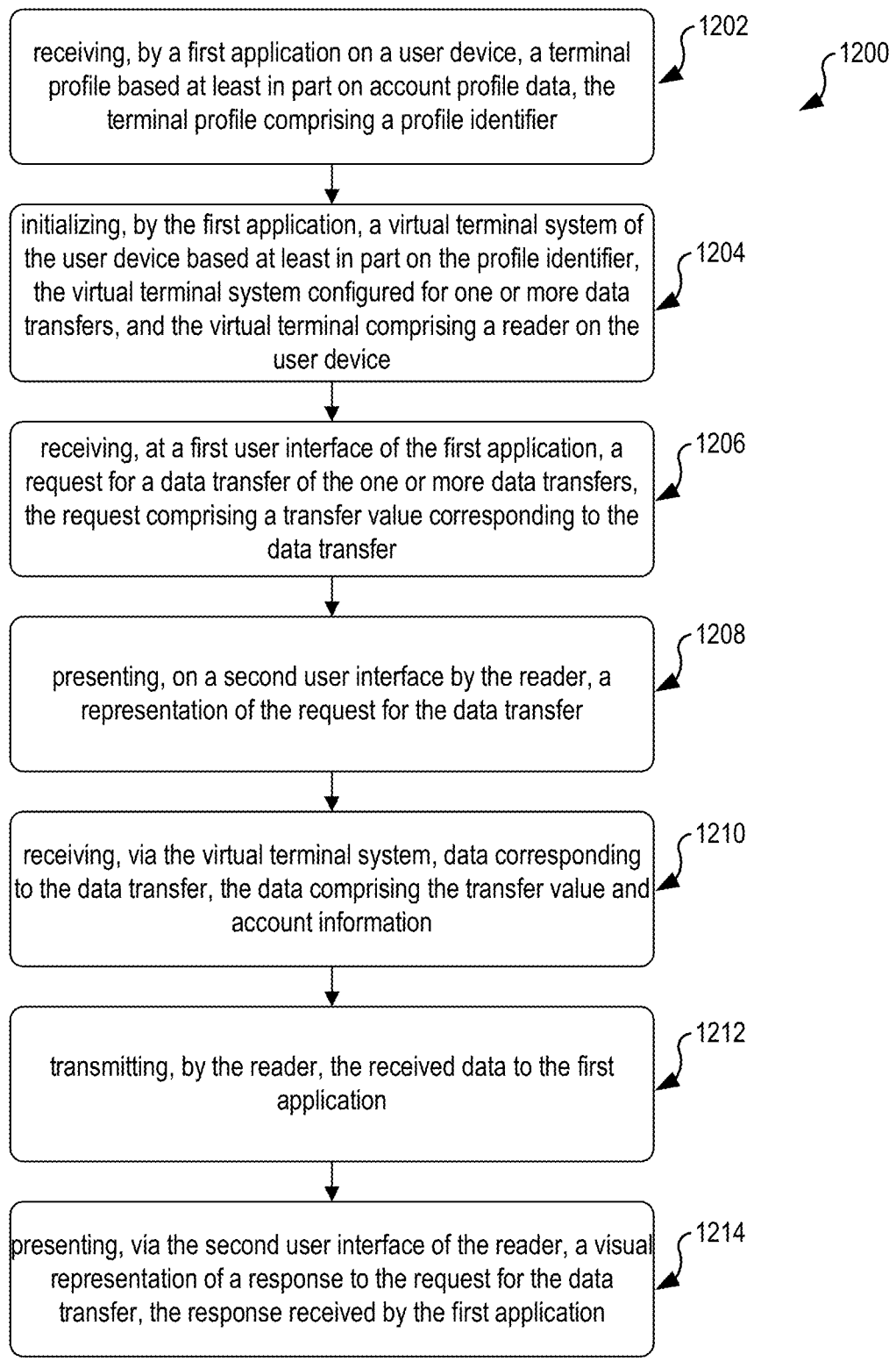
FIG. 12 illustrates a flow diagram for performing the techniques described herein, according to an embodiment of the present disclosure.

FIG. 12 illustrates a flow chart showing an example process 1200 for techniques described herein is shown according to at least one example. Process 1200 is illustrated as logical flow diagrams, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

At block 1202, process 1200 includes receiving, by a first application on a user device, a terminal profile based at least in part on account profile data, the terminal profile comprising a profile identifier.

At block 1204, process 1200 includes initializing, by the first application, a virtual terminal system of the user device based at least in part on the profile identifier, the virtual terminal system configured for one or more data transfers, and the virtual terminal comprising a reader on the user device.

At block 1206, process 1200 includes receiving, at a first user interface of the first application, a request for a data transfer of the one or more data transfers, the request comprising a transfer value corresponding to the data transfer.

At block 1208, process 1200 includes presenting, on a second user interface by the reader, a representation of the request for the data transfer.

At block 1210, process 1200 includes receiving, via the virtual terminal system, data corresponding to the data transfer, the data comprising the transfer value and account information.

At block 1212, process 1200 includes transmitting, by the reader, the received data to the first application.

At block 1214, process 1200 includes presenting, via the second user interface of the reader, a visual representation of a response to the request for the data transfer, the response received by the first application.

Figure 13:
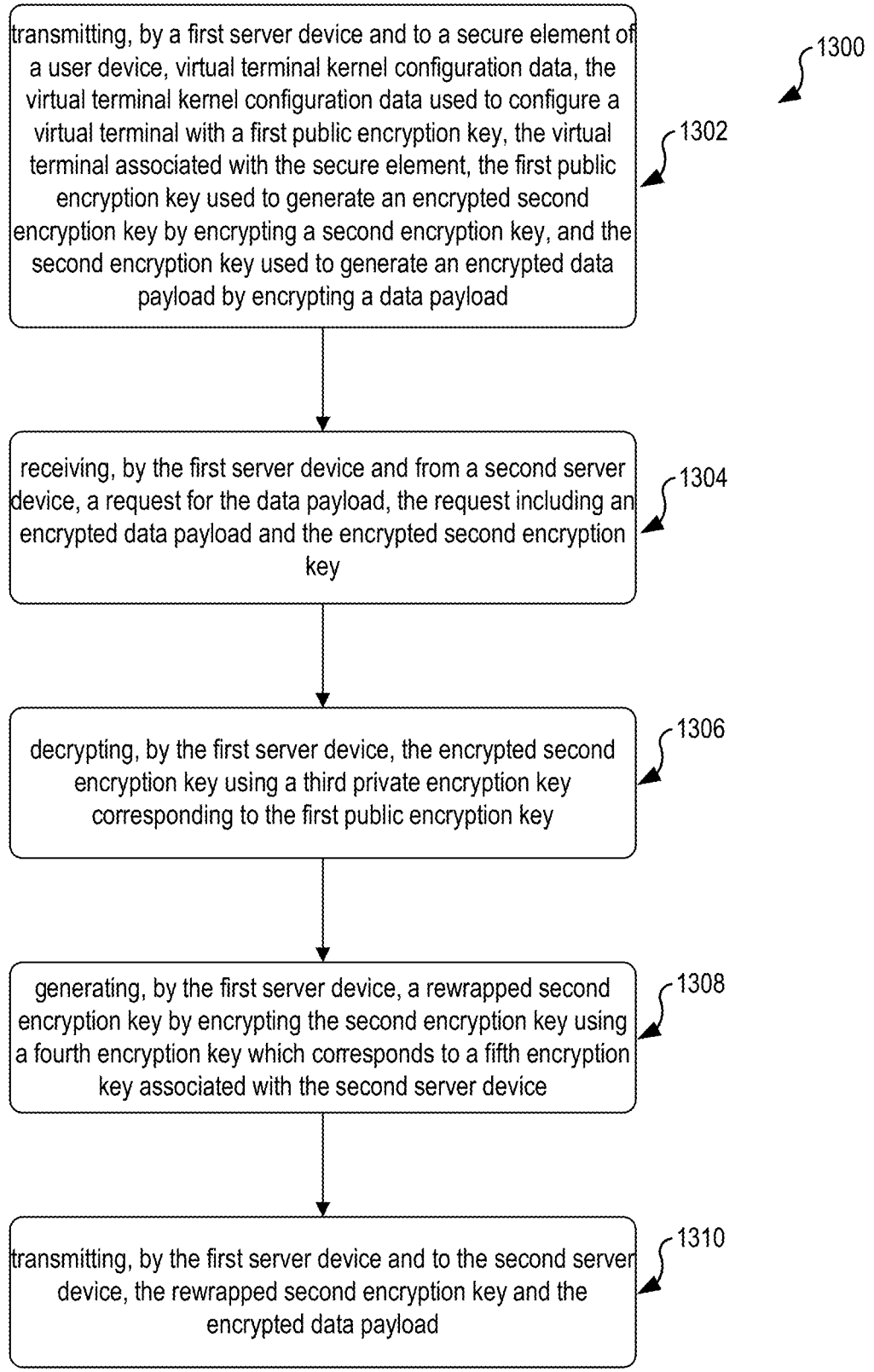
FIG. 13 illustrates a flow diagram for performing the techniques described herein, according to an embodiment of the present disclosure.

FIG. 13 illustrates a flow chart showing an example process 1300 for techniques described herein is shown according to at least one example. Process 1300 is illustrated as logical flow diagrams, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

At block 1302, process 1300 includes transmitting, by a first server device and to a secure element of a user device, virtual terminal kernel configuration data, the virtual terminal kernel configuration data used to configure a virtual terminal with a first public encryption key, the virtual terminal associated with the secure element, the first public encryption key used to generate an encrypted second encryption key by encrypting a second encryption key, and the second encryption key used to generate an encrypted data payload by encrypting a data payload.

At block 1304, process 1300 includes receiving, by the first server device and from a second server device, a request for the data payload, the request including an encrypted data payload and the encrypted second encryption key.

At block 1306, process 1300 includes decrypting, by the first server device, the encrypted second encryption key using a third private encryption key corresponding to the first public encryption key.

At block 1308, process 1300 includes generating, by the first server device, a rewrapped second encryption key by encrypting the second encryption key using a fourth encryption key which corresponds to a fifth encryption key associated with the second server device.

At block 1310, process 1300 includes transmitting, by the first server device and to the second server device, the rewrapped second encryption key and the encrypted data payload.

Figure 14:
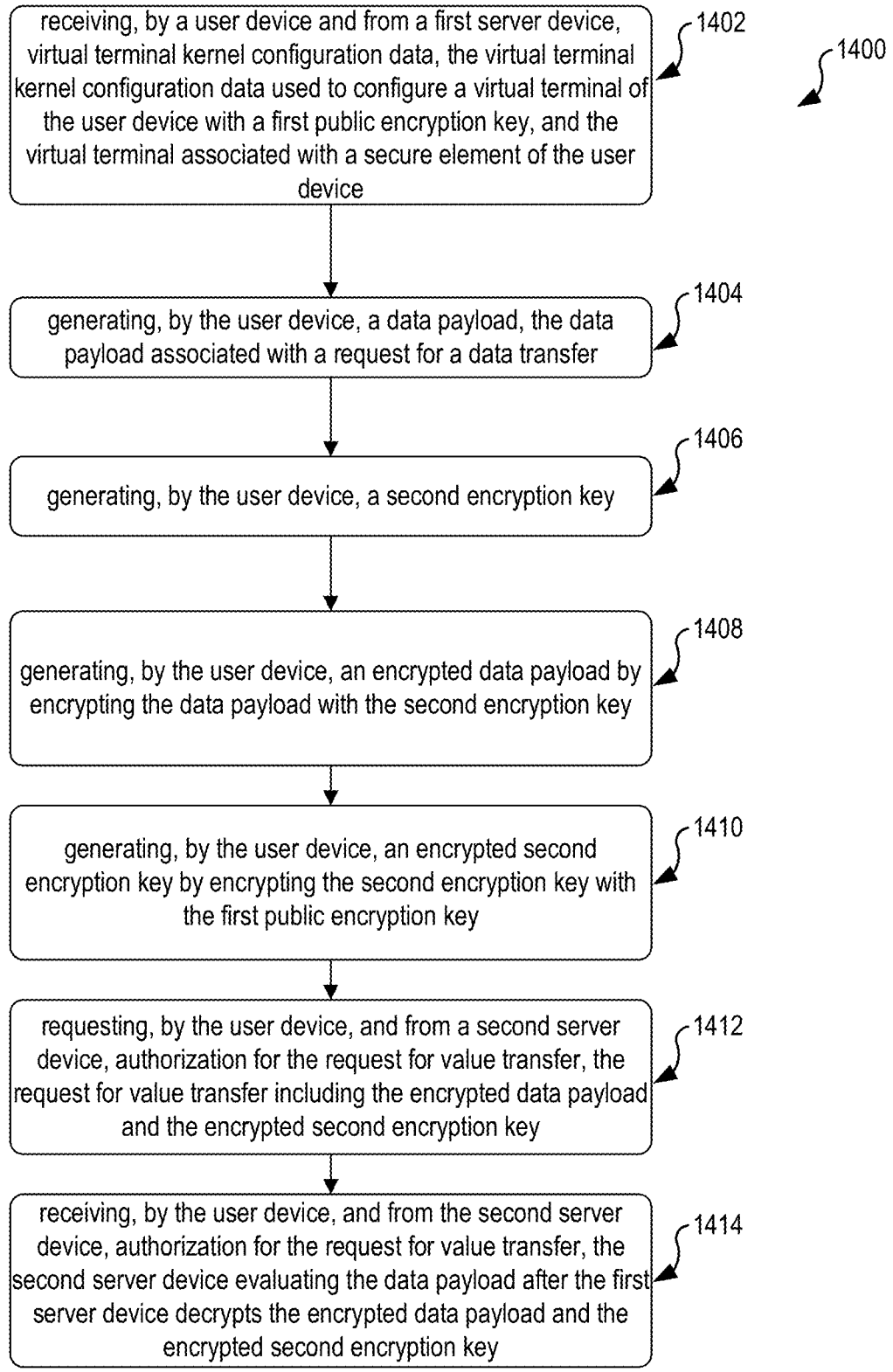
FIG. 14 illustrates a flow diagram for performing the techniques described herein, according to an embodiment of the present disclosure.

FIG. 14 illustrates a flow chart showing an example process 1400 for techniques described herein is shown according to at least one example. Process 1400 is illustrated as logical flow diagrams, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

At block 1402, process 1400 includes receiving, by a user device and from a first server device, virtual terminal kernel configuration data, the virtual terminal kernel configuration data used to configure a virtual terminal of the user device with a first public encryption key, and the virtual terminal associated with a secure element of the user device.

At block 1404, process 1400 includes generating, by the user device, a data payload, the data payload associated with a request for a data transfer.

At block 1406, process 1400 includes generating, by the user device, a second encryption key.

At block 1408, process 1400 includes generating, by the user device, an encrypted data payload by encrypting the data payload with the second encryption key.

At block 1410, process 1400 includes generating, by the user device, an encrypted second encryption key by encrypting the second encryption key with the first public encryption key.

At block 1412, process 1400 includes requesting, by the user device, and from a second server device, authorization for the request for value transfer, the request for value transfer including the encrypted data payload and the encrypted second encryption key.

At block 1414, process 1400 includes receiving, by the user device, and from the second server device, authorization for the request for value transfer, the second server device evaluating the data payload after the first server device decrypts the encrypted data payload and the encrypted second encryption key.

Illustrative methods, systems, and computer-readable media for enabling a virtual terminal for receiving touchless data transfers on a mobile device are described above. Some or all of these systems and methods may, but need not, be implemented at least partially by architectures such as those shown at least in FIGS. 1-14. While many of the examples are described above with reference to personal and/or payment-related information, it should be understood that any type of user information or non-user information (for example, data of any type) may be managed using these techniques. Further, in the foregoing description, various non-limiting examples were described. For purposes of explanation, specific configurations and details are set forth in order to provide a thorough understanding of the examples. However, it should also be apparent to one skilled in the art that the examples may be practiced without the specific details. Furthermore, well-known features were sometimes omitted or simplified in order not to obscure the example being described.

Figure 15:
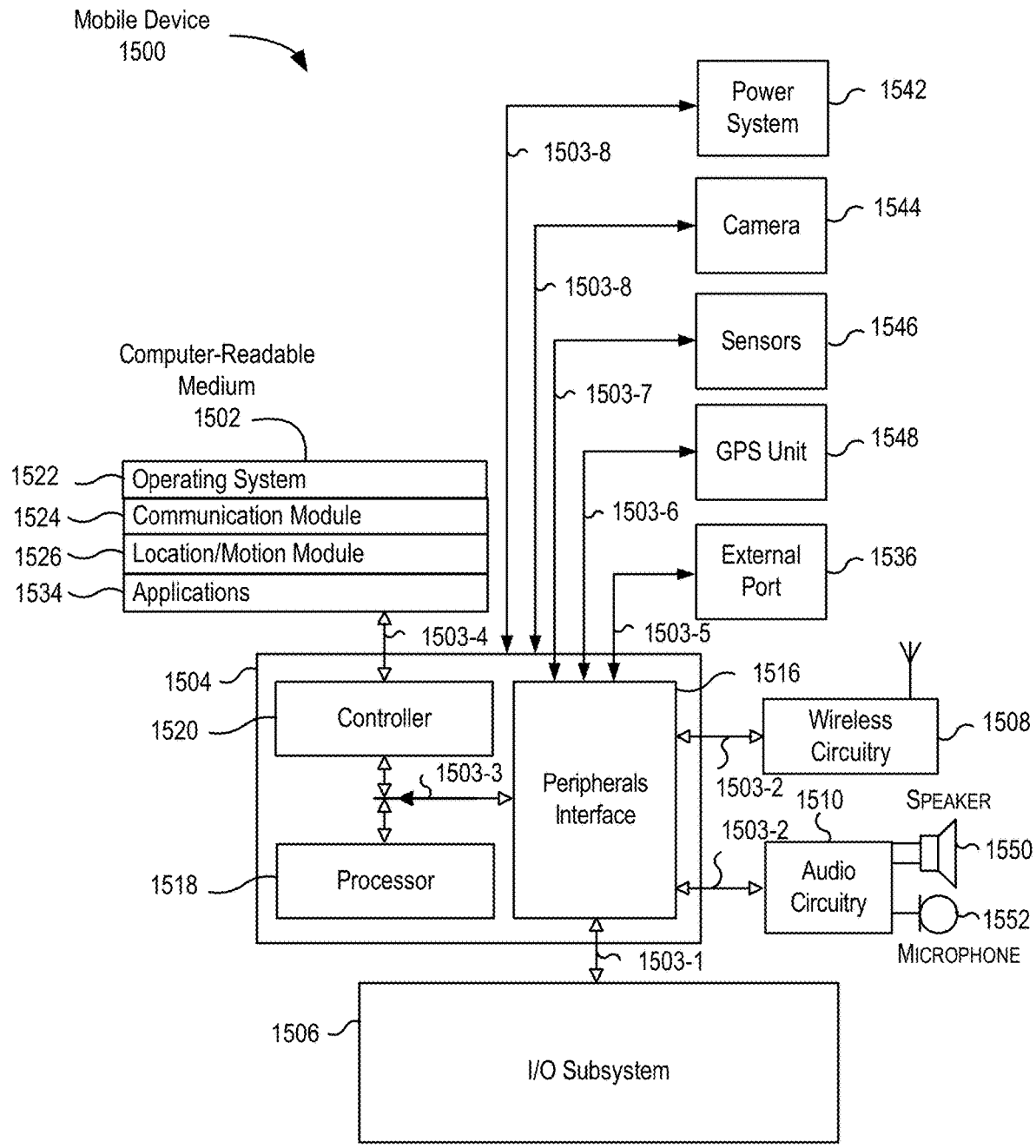
FIG. 15 illustrates an example architecture or environment configured to implement the techniques described herein, according to an embodiment of the present disclosure.

FIG. 15 is a block diagram of an example electronic device 1500. Device 1500 generally includes computer-readable medium 1502, a processing system 1504, an Input/Output (I/O) subsystem 1506, wireless circuitry 1508, and audio circuitry 1510 including speaker 1512 and microphone 1514. These components may be coupled by one or more communication buses or signal lines 1503. Device 1500 can be any portable electronic device, including a handheld computer, a tablet computer, a mobile phone, laptop computer, tablet device, media player, personal digital assistant (PDA), a key fob, a car key, an access card, a multifunction device, a mobile phone, a portable gaming device, a headset, or the like, including a combination of two or more of these items.

It should be apparent that the architecture shown in FIG. 15 is only one example of an architecture for device 1500, and that device 1500 can have more or fewer components than shown, or a different configuration of components. The various components shown in FIG. 15 can be implemented in hardware, software, or a combination of both hardware and software, including one or more signal processing and/or application specific integrated circuits.

Wireless circuitry 1508 is used to send and receive information over a wireless link or network to one or more other devices' conventional circuitry such as an antenna system, a radio frequency (RF) transceiver, one or more amplifiers, a tuner, one or more oscillators, a digital signal processor, a coder-decoder (CODEC) chipset, memory, etc. Wireless circuitry 1508 can use various protocols, for example, as described herein. In various embodiments, wireless circuitry 1508 is capable of establishing and maintaining communications with other devices using one or more communication protocols, including time division multiple access (TDMA), code division multiple access (CDMA), global system for mobile communications (GSM), Enhanced Data GSM Environment (EDGE), wideband code division multiple access (W-CDMA), Long Term Evolution (LTE), LTE-Advanced, Wi-Fi (such as Institute of Electrical and Electronics Engineers (IEEE) 802.11a, IEEE 802.11b, IEEE 802.11g and/or IEEE 802.11n), Bluetooth, Wi-MAX, Voice Over Internet Protocol (VoIP), near field communication protocol (NFC), a protocol for email, instant messaging, and/or a short message service (SMS), or any other suitable communication protocol, including communication protocols not yet developed as of the filing date of this document.

Wireless circuitry 1508 is coupled to processing system 1504 via peripherals interface 1516. Peripherals interface 1516 can include conventional components for establishing and maintaining communication between peripherals and processing system 1504. Voice and data information received by wireless circuitry 1508 (for example, in speech recognition or voice command applications) is sent to one or more processors 1518 via peripherals interface 1516. One or more processors 1518 are configurable to process various data formats for one or more application programs 1534 stored on medium 1502.

Peripherals interface 1516 couple the input and output peripherals of device 1500 to the one or more processors 1518 and computer-readable medium 1502. One or more processors 1518 communicate with computer-readable medium 1502 via a controller 1520. Computer-readable medium 1502 can be any device or medium that can store code and/or data for use by one or more processors 1518. Computer-readable medium 1502 can include a memory hierarchy, including cache, main memory and secondary memory. The memory hierarchy can be implemented using any combination of a random-access memory (RAM) (for example, static random access memory (SRAM,) dynamic random access memory (DRAM), double data random access memory (DDRAM)), read only memory (ROM), FLASH, magnetic and/or optical storage devices, such as disk drives, magnetic tape, CDs (compact disks) and DVDs (digital video discs). In some embodiments, peripherals interface 1516, one or more processors 1518, and controller 1520 can be implemented on a single chip, such as processing system 1504. In some other embodiments, they can be implemented on separate chips.

Processor(s) 1518 can include hardware and/or software elements that perform one or more processing functions, such as mathematical operations, logical operations, data manipulation operations, data transfer operations, controlling the reception of user input, controlling output of information to users, or the like. Processor(s) 1518 can be embodied as one or more hardware processors, microprocessors, microcontrollers, field programmable gate arrays (FPGAs), application-specified integrated circuits (ASICs), or the like. As noted above, the secure element 154 of FIG. 1 is separate from the processor 1518 contemplated here.

Device 1500 also includes a power system 1542 for powering the various hardware components. Power system 1542 can include a power management system, one or more power sources (for example, battery, alternating current (AC)), a recharging system, a power failure detection circuit, a power converter or inverter, a power status indicator (for example, a light emitting diode (LED)) and any other components typically associated with the generation, management and distribution of power in mobile devices.

In some embodiments, device 1500 includes a camera 1544. In some embodiments, device 1500 includes sensors 1546. Sensors can include accelerometers, compass, gyrometer, pressure sensors, audio sensors, light sensors, barometers, and the like. Sensors 1546 can be used to sense location aspects, such as auditory or light signatures of a location.

In some embodiments, device 1500 can include a GPS receiver, sometimes referred to as a GPS unit 1548. A mobile device can use a satellite navigation system, such as the Global Positioning System (GPS), to obtain position information, timing information, altitude, or other navigation information. During operation, the GPS unit can receive signals from GPS satellites orbiting the Earth. The GPS unit analyzes the signals to make a transit time and distance estimation. The GPS unit can determine the current position (current location) of the mobile device. Based on these estimations, the mobile device can determine a location fix, altitude, and/or current speed. A location fix can be geographical coordinates such as latitudinal and longitudinal information.

One or more processors 1518 run various software components stored in medium 1502 to perform various functions for device 1500. In some embodiments, the software components include an operating system 1522, a communication module 1524 (or set of instructions), a location module 1526 (or set of instructions), and other application programs 1534 (or set of instructions).

Operating system 1522 can be any suitable operating system, including iOS, Mac OS, Darwin, Real Time Operating System (RTXC), LINUX, UNIX, OS X, WINDOWS, or an embedded operating system such as VxWorks. The operating system can include various procedures, sets of instructions, software components and/or drivers for controlling and managing general system tasks (for example, memory management, storage device control, power management, etc.) and facilitates communication between various hardware and software components.

Communication module 1524 facilitates communication with other devices over one or more external ports 1536 or via wireless circuitry 1508 and includes various software components for handling data received from wireless circuitry 1508 and/or external port 1536. External port 1536 (for example, universal serial bus (USB), FireWire, Lightning connector, 60-pin connector, etc.) is adapted for coupling directly to other devices or indirectly over a network (for example, the Internet, wireless local area network (LAN), etc.).

Location/motion module 1526 can assist in determining the current position (for example, coordinates or other geographic location identifiers) and motion of device 1500. Modern positioning systems include satellite-based positioning systems, such as Global Positioning System (GPS), cellular network positioning based on "cell IDs," and Wi-Fi positioning technology based on a Wi-Fi networks. GPS also relies on the visibility of multiple satellites to determine a position estimate, which may not be visible (or have weak signals) indoors or in "urban canyons." In some embodiments, location/motion module 1526 receives data from GPS unit 1548 and analyzes the signals to determine the current position of the mobile device. In some embodiments, location/motion module 1526 can determine a current location using Wi-Fi or cellular location technology. For example, the location of the mobile device can be estimated using knowledge of nearby cell sites and/or Wi-Fi access points with knowledge also of their locations. Information identifying the Wi-Fi or cellular transmitter is received at wireless circuitry 1508 and is passed to location/motion module 1526. In some embodiments, the location module receives the one or more transmitter IDs. In some embodiments, a sequence of transmitter IDs can be compared with a reference database (for example, Cell ID database, Wi-Fi reference database) that maps or correlates the transmitter IDs to position coordinates of corresponding transmitters, and computes estimated position coordinates for device 1500 based on the position coordinates of the corresponding transmitters. Regardless of the specific location technology used, location/motion module 1526 receives information from which a location fix can be derived, interprets that information, and returns location information, such as geographic coordinates, latitude/longitude, or other location fix data The one or more applications 1534 on device 1500 can include any applications installed on the device 1500, including without limitation, a browser, address book, contact list, email, instant messaging, social networking, word processing, keyboard emulation, widgets, JAVA-enabled applications, encryption, digital rights management, voice recognition, voice replication, a music player (which plays back recorded music stored in one or more files, such as MP3 or AAC files), etc. As noted above, different applications can be installed in the secure element 124 of FIG. 1. These applications in the secure element 124 of FIG. 1 are installed by the device manufacturer and cannot be added and/or removed by the end user.

There may be other modules or sets of instructions (not shown), such as a graphics module, a time module, etc. For example, the graphics module can include various conventional software components for rendering, animating and displaying graphical objects (including without limitation text, web pages, icons, digital images, animations and the like) on a display surface. In another example, a timer module can be a software timer. The timer module can also be implemented in hardware. The time module can maintain various timers for any number of events.

I/O subsystem 1506 can be coupled to a display system (not shown), which can be a touch-sensitive display. The display displays visual output to the user in a graphical user interface (GUI). The visual output can include text, graphics, video, and any combination thereof. Some or all of the visual output can correspond to user-interface objects. A display can use LED (light emitting diode), LCD (liquid crystal display) technology, or LPD (light emitting polymer display) technology, although other display technologies can be used in other embodiments.

In some embodiments, I/O subsystem 1506 can include a display and user input devices such as a keyboard, mouse, and/or trackpad. In some embodiments, I/O subsystem 1506 can include a touch-sensitive display. A touch-sensitive display can also accept input from the user based at least part on haptic and/or tactile contact. In some embodiments, a touch-sensitive display forms a touch-sensitive surface that accepts user input. The touch-sensitive display/surface (along with any associated modules and/or sets of instructions in computer-readable medium 1502) detects contact (and any movement or release of the contact) on the touch-sensitive display and converts the detected contact into interaction with user-interface objects, such as one or more soft keys, that are displayed on the touch screen when the contact occurs. In some embodiments, a point of contact between the touch-sensitive display and the user corresponds to one or more digits of the user. The user can make contact with the touch-sensitive display using any suitable object or appendage, such as a stylus, pen, finger, and so forth. A touch-sensitive display surface can detect contact and any movement or release thereof using any suitable touch sensitivity technologies, including capacitive, resistive, infrared, and surface acoustic wave technologies, as well as other proximity sensor arrays or other elements for determining one or more points of contact with the touch-sensitive display.

Further, I/O subsystem 1506 can be coupled to one or more other physical control devices (not shown), such as pushbuttons, keys, switches, rocker buttons, dials, slider switches, sticks, LEDs, etc., for controlling or performing various functions, such as power control, speaker volume control, ring tone loudness, keyboard input, scrolling, hold, menu, screen lock, clearing and ending communications and the like. In some embodiments, in addition to the touch screen, device 1500 can include a touchpad (not shown) for activating or deactivating particular functions. In some embodiments, the touchpad is a touch-sensitive area of the device that, unlike the touch screen, does not display visual output. The touchpad can be a touch-sensitive surface that is separate from the touch-sensitive display, or an extension of the touch-sensitive surface formed by the touch-sensitive display.

In some embodiments, some or all of the operations described herein can be performed using an application executing on the user's device. Circuits, logic modules, processors, and/or other components may be configured to perform various operations described herein. Those skilled in the art will appreciate that, depending on implementation, such configuration can be accomplished through design, setup, interconnection, and/or programming of the particular components and that, again depending on implementation, a configured component might or might not be reconfigurable for a different operation. For example, a programmable processor can be configured by providing suitable executable code; a dedicated logic circuit can be configured by suitably connecting logic gates and other circuit elements; and so on.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present disclosure may be created using a data signal encoded with such programs. Computer readable media encoded with the program code may be packaged with a compatible device or provided separately from other devices (for example, via Internet download). Any such computer readable medium may reside on or within a single computer program product (for example, a hard drive or an entire computer system), and may be present on or within different computer program products within a system or network. A computer system may include a monitor, printer, or other suitable display for providing any of the results mentioned herein to a user.

Computer programs incorporating various features of the present disclosure may be encoded on various computer readable storage media; suitable media include magnetic disk or tape, optical storage media, such as compact disk (CD) or DVD (digital versatile disk), flash memory, and the like. Computer readable storage media encoded with the program code may be packaged with a compatible device or provided separately from other devices. In addition, program code may be encoded and transmitted via wired optical, and/or wireless networks conforming to a variety of protocols, including the Internet, thereby allowing distribution, for example, via Internet download. Any such computer readable medium may reside on or within a single computer product (for example, a solid-state drive, a hard drive, a CD, or an entire computer system), and may be present on or within different computer products within a system or network. A computer system may include a monitor, printer, or other suitable display for providing any of the results mentioned herein to a user.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated examples thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a" and "an" and "the" and similar referents in the context of describing the disclosed examples (especially in the context of the following claims) are to be construed to cover both the singular and the plural, unless otherwise indicated herein or clearly contradicted by context. The terms "comprising," "having," "including," and "containing" are to be construed as open-ended terms (for example, meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (for example, "such as") provided herein, is intended merely to better illuminate examples of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is otherwise understood within the context as used in general to present that an item, term, etc., may be either X, Y, or Z, or any combination thereof (for example, X, Y, and/or Z). Thus, such disjunctive language is not generally intended to, and should not, imply that certain examples require at least one of X, at least one of Y, or at least one of Z to each be present.

Preferred examples of this disclosure are described herein, including the best mode known to the inventors for carrying out the disclosure. Variations of those preferred examples may become apparent to those of ordinary skill in the art upon reading the foregoing description. The inventors expect skilled artisans to employ such variations as appropriate, and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

As described above, one aspect of the present technology is sharing personal and/or payment-related data between user devices, which may include storing some aspect of the data on a server. The present disclosure contemplates that in some instances, this gathered data may include personally identifiable information (PII) data that uniquely identifies or can be used to contact or locate a specific person. Such personal information data can include demographic data, location-based data, telephone numbers, email addresses, Twitter IDs, home addresses, data or records relating to a user's credit card information, date of birth, or any other identifying or personal or health information.

The present disclosure recognizes that the use of such personal information data, in the present technology, can be used to the benefit of users. For example, the personal information data can be used to process a data transfer or to pay for a transaction with a source. Further, other uses for personal information data that benefit the user are also contemplated by the present disclosure.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the U.S., collection of or access to certain health data may be governed by federal and/or state laws, such as the Health Insurance Portability and Accountability Act (HIPAA); whereas health data in other countries may be subject to other regulations and policies and should be handled accordingly. Hence, different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services or other services relating to health record management, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health-related applications, data de-identification can be used to protect a user's privacy. De-identification may be facilitated, when appropriate, by removing specific identifiers (for example, date of birth), controlling the amount or specificity of data stored (for example, collecting location data at a city level rather than at an address level), controlling how data is stored (for example, aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data.

What is claimed is:

1. A method, comprising:
   receiving, by a user device and from a first server device, virtual terminal kernel configuration data, the virtual terminal kernel configuration data used to configure a virtual terminal of the user device with a first public encryption key, and the virtual terminal associated with a secure element of the user device;
   generating, by the user device, a data payload, the data payload associated with a request for a data transfer;
   generating, by the user device, a second encryption key;
   generating, by the user device, an encrypted data payload by encrypting the data payload with the second encryption key;
   generating, by the user device, an encrypted second encryption key by encrypting the second encryption key with the first public encryption key;
   requesting, by the user device, and from a second server device, authorization for the request for data transfer, the request for data transfer including the encrypted data payload and the encrypted second encryption key; and
   receiving, by the user device, and from the second server device, authorization for the request for data transfer, the second server device evaluating the data payload after the first server device decrypts the encrypted data payload and the encrypted second encryption key.

2. The method of claim 1, wherein the secure element is a part of the user device, wherein the secure element is a separate hardware module configured for security and cryptography, and wherein the secure element is separate from an application processor on the user device.

3. The method of claim 2, wherein generating the second encryption key and generating the encrypted data payload are performed by the secure element.

4. The method of claim 1, further comprising sending, to the first server device, a kernel token, the kernel token indicative that the second server device has authorized the user device to generate one or more data payloads.

5. The method of claim 4, further comprising:
   sending, to the first server device, a reader token, the reader token including a first data associated with the user device and a second data associated with the second server device;
   receiving, from the first server device, the kernel token, the kernel token indicative that the reader token is valid; and
   sending, to the first server device, a request for the virtual terminal kernel configuration data, the request including the kernel token.

6. The method of claim 1, further comprising:
receiving, from the first server device, a session token, the session token indicative that the first server device has authorized the user device to generate the data payload, the data payload to be processed by the second server device; and
validating the session token, and
wherein the request for the data transfer from the server device further includes the session token.

7. The method of claim 1, wherein the second encryption key is only known by the secure element.

8. A computing device, comprising:
one or more memories; and
one or more processors in communication with the one or more memories and configured to execute instructions stored in the one or more memories to cause the computing device to:
receive, by a user device and from a first server device, virtual terminal kernel configuration data, the virtual terminal kernel configuration data used to configure a virtual terminal of the user device with a first public encryption key, and the virtual terminal associated with a secure element of the user device;
generate, by the user device, a data payload, the data payload associated with a request for a data transfer;
generate, by the user device, a second encryption key;
generate, by the user device, an encrypted data payload by encrypting the data payload with the second encryption key;
generate, by the user device, an encrypted second encryption key by encrypting the second encryption key with the first public encryption key;
request, by the user device, and from a second server device, authorization for the request for data transfer, the request for data transfer including the encrypted data payload and the encrypted second encryption key; and
receive, by the user device, and from the second server device, authorization for the request for data transfer, the second server device evaluating the data payload after the first server device decrypts the encrypted data payload and the encrypted second encryption key.

9. The computing device of claim 8, wherein the secure element is a part of the user device, wherein the secure element is a separate hardware module configured for security and cryptography, and wherein the secure element is separate from an application processor on the user device.

10. The computing device of claim 9, wherein generating the second encryption key and generating the encrypted data payload are performed by the secure element.

11. The computing device of claim 8, wherein the one or more processors are further configured to send, to the first server device, a kernel token, the kernel token indicative that the second server device has authorized the user device to generate one or more data payloads.

12. The computing device of claim 11, wherein the one or more processors are further configured to:
send, to the first server device, a reader token, the reader token including a first data associated with the user device and a second data associated with the second server device;
receive, from the first server device, the kernel token, the kernel token indicative that the reader token is valid; and
send, to the first server device, a request for the virtual terminal kernel configuration data, the request including the kernel token.

13. The computing device of claim 8, wherein the one or more processors are further configured to:
receive, from the first server device, a session token, the session token indicative that the first server device has authorized the user device to generate the data payload, the data payload to be processed by the second server device; and
validate the session token, and
wherein the request for the data transfer from the server device further includes the session token.

14. The computing device of claim 8, wherein the second encryption key is only known by the secure element.

15. A non-transitory computer-readable storage medium having stored thereon program instructions that, when executed by one or more processors of a user device, cause the user device to perform operations comprising:
receiving, from a first server device, virtual terminal kernel configuration data, the virtual terminal kernel configuration data used to configure a virtual terminal of the user device with a first public encryption key, and the virtual terminal associated with a secure element of the user device;
generating a data payload, the data payload associated with a request for a data transfer;
generating a second encryption key;
generating an encrypted data payload by encrypting the data payload with the second encryption key;
generating an encrypted second encryption key by encrypting the second encryption key with the first public encryption key; and
requesting, from a second server device, authorization for the request for data transfer, the request for data transfer including the encrypted data payload and the encrypted second encryption key;
receiving, from the second server device, authorization for the request for data transfer, the second server device evaluating the data payload after the first server device decrypts the encrypted data payload and the encrypted second encryption key.

16. The non-transitory computer-readable storage medium of claim 15, wherein the secure element is a part of the user device, wherein the secure element is a separate hardware module configured for security and cryptography, and wherein the secure element is separate from an application processor on the user device.

17. The non-transitory computer-readable storage medium of claim 16, wherein generating the second encryption key and generating the encrypted data payload are performed by the secure element.

18. The non-transitory computer-readable storage medium of claim 15, wherein operations further comprise sending, to the first server device, a kernel token, the kernel token indicative that the second server device has authorized the user device to generate one or more data payloads.

19. The non-transitory computer-readable storage medium of claim 18, wherein operations further comprise:
sending, to the first server device, a reader token, the reader token including a first data associated with the user device and a second data associated with the second server device;
receiving, from the first server device, the kernel token, the kernel token indicative that the reader token is valid; and sending, to the first server device, a request for the virtual terminal kernel configuration data, the request including the kernel token.

20. The non-transitory computer-readable storage medium of claim 15, wherein operations further comprise:
receiving, from the first server device, a session token, the session token indicative that the first server device has authorized the user device to generate the data payload, the data payload to be processed by the second server device; and
validating the session token, and
wherein the request for the data transfer from the server device further includes the session token.

* * * * *